United States Patent
Tirkkonen

(10) Patent No.: US 7,355,961 B2
(45) Date of Patent: *Apr. 8, 2008

(54) METHOD AND ARRANGEMENT FOR DIGITAL SIGNAL TRANSMISSION USING LAYERED SPACE-TIME CODES

(75) Inventor: Olav Tirkkonen, Helsinki (FI)

(73) Assignee: Nokia Corporation, Espoo (FI)

( * ) Notice: Subject to any disclaimer, the term of this patent is extended or adjusted under 35 U.S.C. 154(b) by 293 days.

This patent is subject to a terminal disclaimer.

(21) Appl. No.: 11/070,624

(22) Filed: Mar. 2, 2005

(65) Prior Publication Data

US 2005/0190853 A1 Sep. 1, 2005

Related U.S. Application Data

(62) Division of application No. 09/676,373, filed on Sep. 29, 2000, now Pat. No. 6,865,237.

(60) Provisional application No. 60/193,402, filed on Mar. 29, 2000.

(30) Foreign Application Priority Data

Feb. 22, 2000 (FI) .................. 20000406
Sep. 4, 2000 (FI) .................. 20001944

(51) Int. Cl.
*H04J 11/00* (2006.01)
(52) U.S. Cl. ...................... 370/208; 370/335
(58) Field of Classification Search ........ 370/203, 370/208, 328, 335, 341, 342, 431, 441; 375/295, 375/267, 259, 285, 260

See application file for complete search history.

(56) References Cited

U.S. PATENT DOCUMENTS 6,088,408 A 7/2000 Calderbank et al.

(Continued)

FOREIGN PATENT DOCUMENTS

EP 0 905 920 B1 3/1999

(Continued)

OTHER PUBLICATIONS

Hochwald, et al., "Systematic Design of Unitary Space-Time Constellations," Technical Report, Bell Laboratories, Lucent Technologies, Sep. 1998, revised Oct. 1999 and Mar. 2000, pp. 1-27, Murray Hill, NJ.

(Continued)

*Primary Examiner*—Ajit Patel
(74) *Attorney, Agent, or Firm*—Slater & Matsil, L.L.P.

(57) ABSTRACT

The invention relates to a method and an arrangement for transmitting a digital signal consisting of symbols, which arrangement comprises a coder (308) for coding complex symbols to channel symbols in blocks having the length of a given K, means (312) for transmitting the channel symbols via several different channels and two or more antennas (314 to 318). The coder (308) is arranged to code the symbols using a code matrix, which can be expressed as a sum of 2K elements, in which each element is a product of a symbol or symbol complex conjugate to be transmitted and a N×N representation matrix of a complexified anti-commutator algebra, extended by a unit element, and in which each matrix is used at most once in the formation of the code matrix. A code matrix is also provided which is formed by matrices of a portion of the symbols placed on the diagonal of the code matrix and by matrices of a second portion of symbols along the anti-diagonal of the code matrix.

34 Claims, 5 Drawing Sheets

U.S. PATENT DOCUMENTS

| | | | |
|---|---|---|---|
| 6,097,771 A | 8/2000 | Foschini | |
| 6,178,196 B1 | 1/2001 | Naguib et al. | |
| 6,317,411 B1 | 11/2001 | Whinnett et al. | |
| 6,317,466 B1 | 11/2001 | Foschini et al. | |
| 6,631,168 B2 | 10/2003 | Izumi | |
| 6,741,658 B1 | 5/2004 | Ionescu | |
| 6,865,237 B1* | 3/2005 | Boariu et al. | 375/295 |
| 2004/0071240 A1* | 4/2004 | Betts | 375/346 |
| 2004/0243904 A1* | 12/2004 | Kim et al. | 714/755 |
| 2005/0190853 A1* | 9/2005 | Tirkkonen | 375/295 |
| 2005/0201481 A1* | 9/2005 | Calderbank et al. | 375/265 |

FOREIGN PATENT DOCUMENTS

| | | |
|---|---|---|
| GB | 2 237 706 A | 5/1991 |
| WO | WO 97/41670 | 11/1997 |
| WO | WO 99/14871 | 3/1999 |
| WO | WO 99/23766 | 5/1999 |
| WO | WO 00/11806 | 3/2000 |
| WO | WO 00/18056 | 3/2000 |
| WO | WO 00/49780 | 8/2000 |
| WO | WO 00/61265 | 8/2000 |
| WO | WO 01/19013 A1 | 3/2001 |
| WO | WO 01/63826 A1 | 6/2001 |
| WO | WO 01/54305 A1 | 7/2001 |
| WO | WO 01/56218 A1 | 8/2001 |
| WO | WO 01/69814 A1 | 9/2001 |
| WO | WO 01/76094 A2 | 10/2001 |
| WO | WO 02/058311 A1 | 7/2002 |

OTHER PUBLICATIONS

Tirkkonen, O., et al., "Complex Space-Time Block Codes for Four Tx Antennas," IEEE, 2000, pp. 1005-1009, 0-7803-6451-1/00.

Tirkkonen, O., et al., "The Algebraic Structure of Space-Time Block Codes," Finnish Wireless Communications Workshop, FWCW'00, May 30, 2000, pp. 80-84, Oulu, Finland.

Alamouti, S.M., et al.; Trellis-Coded Modulation and Transmit Diversity: Design Criteria and Performance Evaluation; 1998 IEEE; pp. 703-707; 0-7803-5106-1/98.

Alamouti, S.M.: "A Simple Transmit Diversity Technique for Wireless Communications," IEEE Journal on Selected Areas in Communications, IEEE Inc. New York, US, vol. 16, No. 8, Oct. 1998. pp. 1451-1458, XP002100058, ISSN: 0733-8716, cited in the application the whole document.

Alamouti, S.M.; A Simple Transmit Diversity Technique for Wireless Communications; 1998 IEEE; IEEE Journal on Select Areas in Communications; vol. 16, No. 8, Oct. 1998.

Calderbank, A., et al.; Space-Time Codes for Wireless Communication; 19997 IEEE; ISIT 1997, Ulm, Germany, Jun. 29-Jul. 4; p. 146.

Damen, O., et al.: Lattice Code Decoder for Space-Time Codes; IEEE 2000; p. 161-p. 163; 1089-7798/00; IEEE Communications Letters. vol. 4, No. 5, May 2000.

Foschini, G.; Layered Space-Time Architecture for Wireless Communication in a Fading Environment When Using Multi-Element Antennas; Bell Labs Technical Journal, 1996; p. 41-p. 59.

Guey, J.-C.: "Concatenated coding for transmit diversity systems" Proceedings of the 1999 VTC-Fall IEEE VTS 50th Vehicular Technology Conference 'Gateway to 21st Century Communications Village'; Amsterdam, Neth. Sep. 19-22, 1999, vol. 5, 1999 pp. 2500-2504, XP002181329 IEEE Veh. Technol. Conf.; IEEE Vehicular Technology Conference 1999 IEEE, Piscataway, NJ, USA.

Hassibi, B., et al.; "High-Rate Codes that are Linear in Space and Time"; Aug. 22, 2000; 55 pp.; Bell Laboratories, Lucent Technologies; Murray Hill, NJ 07974 USA.

Holma H., et al., Ed.; WCDMA for UMTS Radio Access for Third Generation Mobile Communications; Reprinted Jun. 2000; p. 97; John Wiley & Sons, Ltd., Beffins Lane, Chichester, West Sussex, PO19 1UD, England.

Hottinen, A., et al.; Closed-loop transmit diversity techniques for multi-element transceivers: IEEE 2000; p. 70-73; 0-7803-6507-0/00.

Jalloul, L.M.A., et al.; Performance Analysis of CDMA Transmit Diversity Methods; 1999 IEEE; pp. 1326-1330; 0-7803-5435-4/99.

Lo, T., et al.; Space-Time Block Coding-From a Physical Perspective; 1999 IEEE; pp. 150-153; 0-7803-5668-3/99.

Lonescu, D.M.; New Results on Space-Time Code Design Criteria; 1999 IEEE; pp. 684-687; 0-7803-5668-3/ 99.

Naguib, A.F., et al.; Space-Time Coded Modulation for High Data Rate Wireless Communications; 1997 IEEE; pp. 102-109; 0-7803-4198-8/97.

Seshadri, N., et al.; Space-Time Codes for Wireless Communication: Code Construction: 1997 IEEE; pp. 637-641; 0-7803-3659-3/97.

Shiu, D., et al.; "Layered Space-Time Codes for Wireless Communications Using Multiple Transmit Antennas"; 0-7803-5284-X99; 436-440 pp.; 1999 IEEE; University of California at Berkeley USA.

Shiu, D., et al.; "Scalable Layered Space-Time Codes for Wireless Communications: Performance Analysis and Design Criteria"; 0-7803-5668-3/99; 159-163 pp.; 1999 IEEE; University of California at Berkeley USA.

Sweatman, C., et al.; A Comparison of Detection Algorithms Including BLAST for Wireless Communication using Multiple Antennas; IEEE 2000; p. 698-p. 703; 0-7803-6465-5/ 00.

Tarokh, V., et al.; "Space-Time Block Coding for Wireless Communications: Performance Results," IEEE Journal on Selected Areas in Communications, IEEE Inc. New York, US, vol. 17, No. 3, Mar. 1999, pp. 451-460, XP000804974 ISSN: 0733-8716 equations (6) and (7).

Tarokh, V., et al.; A Differential Detection Scheme for Transmit Diversity; 1999 IEEE; pp. 1043-1047; 0-7803-5668-3/ 99.

Tarokh, V., et al.; New Detection Schemes for Transmit Diversity with No Channel Estimation; 1998 IEEE; pp. 917-920 0-7803-5108-1/98.

Tarokh, V., et al.; Space-Time Block Codes from Orthogonal Designs; 1999 IEEE; IEEE Transactions on Information Theory; vol. 45, No. 5, Jul. 1999.

Tarokh, V., et al.; Space-Time Codes for High Data Rate Wireless Communication: Performance Criteria in the Presence of Channel Estimation Errors, Mobility, and Multiple Paths; 1999 IEEE; IEEE Transactions on Communications; vol. 47, No. 2; Feb. 1999.

Tarokh, V., et al.; The Application of Orthogonal Designs to Wireless Communication; 1998 IEEE; pp. 46-47; 0-7803-4408-1/98.

Tarokh, V., et al; Space-Time Block Coding for Wireless Communications: Performance Results; 1999 IEEE; IEEE Journal on Selected Areas in Communications, vol. 17, No. 3, Mar. 1999.

Tarokh,V., et al.: Space-Time Codes for High Data Rate Wireless Communication: Performance Criterion and Code Construction; 1998 IEEE; IEEE Transactions on Information Theory, vol. 44, No. 2, Mar. 1998.

Tirkkonen, O., et al.; Minimal Non-Orthogonality Rate 1 Space-Time Block Code for 3+ Tx Antennas; IEEE Sep. 6-8, 2000: 6th Int. Symp. on Spread-Spectrum Tech. & Appli., NJIT, New Jersey, USA; p. 429-p. 432.

* cited by examiner

FIG. 5A

| LAYER ONE | | | | LAYER TWO | | | | LAYER THREE | | | |
|---|---|---|---|---|---|---|---|---|---|---|---|
| $z_1$ | $z_2$ | $z_3$ | 0 | 0 | 0 | 0 | 0 | 0 | 0 | 0 | 0 |
| $-z_2^*$ | $z_1^*$ | 0 | $-z_3$ | 0 | 0 | $z_{15}$ | 0 | 0 | 0 | 0 | 0 |
| $-z_3^*$ | 0 | $z_1^*$ | $z_2$ | 0 | $-z_{14}$ | 0 | 0 | 0 | 0 | 0 | 0 |
| 0 | $z_3^*$ | $-z_2^*$ | $z_1$ | $-z_{13}$ | 0 | 0 | 0 | 0 | 0 | 0 | 0 |
| $z_4$ | $z_5$ | $z_6$ | 0 | 0 | 0 | 0 | $-z_{15}$ | 0 | 0 | 0 | 0 |
| $-z_5^*$ | $z_4^*$ | 0 | $-z_6$ | 0 | 0 | 0 | 0 | 0 | 0 | $z_{63}$ | 0 |
| $-z_6^*$ | 0 | $z_4^*$ | $z_5$ | 0 | $-z_{13}$ | 0 | 0 | 0 | 0 | 0 | 0 |
| 0 | $z_6^*$ | $-z_5^*$ | $z_4$ | $z_{14}^*$ | 0 | 0 | 0 | 0 | 0 | 0 | 0 |
| $z_7$ | $z_8$ | $z_9$ | 0 | 0 | 0 | 0 | $z_{14}$ | 0 | 0 | 0 | 0 |
| $-z_8^*$ | $z_7^*$ | 0 | $-z_9$ | 0 | 0 | $z_{13}^*$ | 0 | 0 | 0 | 0 | 0 |
| $-z_9^*$ | 0 | $z_7^*$ | $z_8$ | 0 | 0 | 0 | 0 | 0 | $z_{62}$ | 0 | 0 |
| 0 | $z_9^*$ | $-z_8^*$ | $z_7$ | $z_{15}^*$ | 0 | 0 | 0 | 0 | 0 | 0 | 0 |
| $z_{10}$ | $z_{11}$ | $z_{12}$ | 0 | 0 | 0 | 0 | $z_{13}$ | 0 | 0 | 0 | 0 |
| $-z_{11}^*$ | $z_{10}$ | 0 | $-z_{12}$ | 0 | 0 | $-z_{14}^*$ | 0 | 0 | 0 | 0 | 0 |
| $-z_{12}^*$ | 0 | $z_{10}^*$ | $z_{11}$ | 0 | $-z_{15}^*$ | 0 | 0 | 0 | 0 | 0 | 0 |
| 0 | $z_{12}^*$ | $-z_{11}^*$ | $z_{10}$ | 0 | 0 | 0 | 0 | $z_{61}$ | 0 | 0 | 0 |
| $z_{16}$ | $z_{17}$ | $z_{18}$ | 0 | 0 | 0 | 0 | 0 | 0 | 0 | 0 | $-z_{63}$ |
| $-z_{17}^*$ | $z_{16}^*$ | 0 | $-z_{18}$ | 0 | 0 | $z_{30}$ | 0 | 0 | 0 | 0 | 0 |
| $-z_{18}^*$ | 0 | $z_{16}^*$ | $z_{17}$ | 0 | $-z_{29}$ | 0 | 0 | 0 | 0 | 0 | 0 |
| 0 | $z_{18}^*$ | $-z_{17}^*$ | $z_{16}$ | $-z_{28}$ | 0 | 0 | 0 | 0 | 0 | 0 | 0 |
| $z_{19}$ | $z_{20}$ | $z_{21}$ | 0 | 0 | 0 | 0 | $-z_{30}$ | 0 | 0 | 0 | 0 |
| $-z_{20}^*$ | $z_{19}^*$ | 0 | $-z_{21}$ | 0 | 0 | 0 | 0 | 0 | 0 | 0 | 0 |
| $-z_{21}^*$ | 0 | $z_{19}^*$ | $z_{20}$ | 0 | $-z_{28}^*$ | 0 | 0 | 0 | 0 | 0 | 0 |
| 0 | $z_{21}^*$ | $-z_{20}^*$ | $z_{19}$ | $z_{29}^*$ | 0 | 0 | 0 | 0 | 0 | 0 | 0 |
| $z_{22}$ | $z_{23}$ | $z_{24}$ | 0 | 0 | 0 | 0 | $z_{29}$ | 0 | 0 | 0 | 0 |
| $-z_{23}^*$ | $z_{22}$ | 0 | $-z_{24}$ | 0 | 0 | $z_{28}^*$ | 0 | 0 | 0 | 0 | 0 |
| $-z_{24}^*$ | 0 | $z_{22}^*$ | $z_{23}$ | 0 | 0 | 0 | 0 | 0 | $z_{61}^*$ | 0 | 0 |
| 0 | $z_{24}^*$ | $-z_{23}^*$ | $z_{22}$ | $z_{30}^*$ | 0 | 0 | 0 | 0 | 0 | 0 | 0 |
| $z_{25}$ | $z_{26}$ | $z_{27}$ | 0 | 0 | 0 | 0 | $z_{28}$ | 0 | 0 | 0 | 0 |
| $-z_{26}^*$ | $z_{25}$ | 0 | $-z_{27}$ | 0 | 0 | $-z_{29}^*$ | 0 | 0 | 0 | 0 | 0 |
| $-z_{27}^*$ | 0 | $z_{25}^*$ | $z_{26}$ | 0 | $-z_{30}$ | 0 | 0 | 0 | 0 | 0 | 0 |
| 0 | $z_{27}^*$ | $-z_{26}^*$ | $z_{25}$ | 0 | 0 | 0 | 0 | $-z_{62}^*$ | 0 | 0 | 0 |

*FROM FIG. 5A*

| LAYER ONE | | | | LAYER TWO | | | | LAYER THREE | | | |
|---|---|---|---|---|---|---|---|---|---|---|---|
| $z_{31}$ | $z_{32}$ | $z_{33}$ | 0 | 0 | 0 | 0 | 0 | 0 | 0 | 0 | $z_{62}$ |
| $-z_{32}^*$ | $z_{31}^*$ | 0 | $-z_{33}$ | 0 | 0 | $z_{45}$ | 0 | 0 | 0 | 0 | 0 |
| $-z_{33}^*$ | 0 | $z_{31}^*$ | $z_{32}$ | 0 | $-z_{44}$ | 0 | 0 | 0 | 0 | 0 | 0 |
| 0 | $z_{33}^*$ | $-z_{32}^*$ | $z_{31}$ | $-z_{43}$ | 0 | 0 | 0 | 0 | 0 | 0 | 0 |
| $z_{34}$ | $z_{35}$ | $z_{36}$ | 0 | 0 | 0 | 0 | $-z_{45}$ | 0 | 0 | 0 | 0 |
| $-z_{35}^*$ | $z_{34}^*$ | 0 | $-z_{36}$ | 0 | 0 | 0 | 0 | 0 | 0 | $z_{61}^*$ | 0 |
| $-z_{36}^*$ | 0 | $z_{34}^*$ | $z_{35}$ | 0 | $-z_{43}^*$ | 0 | 0 | 0 | 0 | 0 | 0 |
| 0 | $z_{36}^*$ | $-z_{35}^*$ | $z_{34}$ | $z_{44}^*$ | 0 | 0 | 0 | 0 | 0 | 0 | 0 |
| $z_{37}$ | $z_{38}$ | $z_{39}$ | 0 | 0 | 0 | 0 | $z_{44}$ | 0 | 0 | 0 | 0 |
| $-z_{38}^*$ | $z_{37}^*$ | 0 | $-z_{39}$ | 0 | 0 | $z_{43}^*$ | 0 | 0 | 0 | 0 | 0 |
| $-z_{39}^*$ | 0 | $z_{37}^*$ | $z_{38}$ | 0 | 0 | 0 | 0 | 0 | 0 | 0 | 0 |
| 0 | $z_{39}^*$ | $-z_{38}^*$ | $z_{37}$ | $z_{45}^*$ | 0 | 0 | 0 | 0 | 0 | 0 | 0 |
| $z_{40}$ | $z_{41}$ | $z_{42}$ | 0 | 0 | 0 | 0 | $z_{43}$ | 0 | 0 | 0 | 0 |
| $-z_{41}^*$ | $z_{40}^*$ | 0 | $-z_{42}$ | 0 | 0 | $-z_{44}^*$ | 0 | 0 | 0 | 0 | 0 |
| $-z_{42}^*$ | 0 | $z_{40}^*$ | $z_{41}$ | 0 | $-z_{45}^*$ | 0 | 0 | 0 | 0 | 0 | 0 |
| 0 | $z_{42}^*$ | $-z_{41}^*$ | $z_{40}$ | 0 | 0 | 0 | 0 | $-z_{63}^*$ | 0 | 0 | 0 |
| $z_{46}$ | $z_{47}$ | $z_{48}$ | 0 | 0 | 0 | 0 | 0 | 0 | 0 | 0 | $z_{61}$ |
| $-z_{47}^*$ | $z_{46}^*$ | 0 | $-z_{48}$ | 0 | 0 | $z_{60}$ | 0 | 0 | 0 | 0 | 0 |
| $-z_{48}^*$ | 0 | $z_{46}^*$ | $z_{47}$ | 0 | $-z_{59}$ | 0 | 0 | 0 | 0 | 0 | 0 |
| 0 | $z_{48}^*$ | $-z_{47}^*$ | $z_{46}$ | $-z_{58}$ | 0 | 0 | 0 | 0 | 0 | 0 | 0 |
| $z_{49}$ | $z_{50}$ | $z_{51}$ | 0 | 0 | 0 | 0 | $-z_{60}$ | 0 | 0 | 0 | 0 |
| $-z_{50}^*$ | $z_{49}^*$ | 0 | $-z_{51}$ | 0 | 0 | 0 | 0 | 0 | 0 | $-z_{62}^*$ | 0 |
| $-z_{51}^*$ | 0 | $z_{49}^*$ | $z_{50}$ | 0 | $-z_{58}^*$ | 0 | 0 | 0 | 0 | 0 | 0 |
| 0 | $z_{51}^*$ | $-z_{50}^*$ | $z_{49}$ | $z_{59}^*$ | 0 | 0 | 0 | 0 | 0 | 0 | 0 |
| $z_{52}$ | $z_{53}$ | $z_{54}$ | 0 | 0 | 0 | 0 | $z_{59}$ | 0 | 0 | 0 | 0 |
| $-z_{53}^*$ | $z_{52}^*$ | 0 | $-z_{54}$ | 0 | 0 | $z_{58}^*$ | 0 | 0 | 0 | 0 | 0 |
| $-z_{54}^*$ | 0 | $z_{52}^*$ | $z_{53}$ | 0 | 0 | 0 | 0 | 0 | $z_{63}^*$ | 0 | 0 |
| 0 | $z_{54}^*$ | $-z_{53}^*$ | $z_{52}$ | $z_{60}^*$ | 0 | 0 | 0 | 0 | 0 | 0 | 0 |
| $z_{55}$ | $z_{56}$ | $z_{57}$ | 0 | 0 | 0 | 0 | $z_{58}$ | 0 | 0 | 0 | 0 |
| $-z_{56}^*$ | $z_{55}^*$ | 0 | $z_{57}$ | 0 | 0 | $-z_{59}^*$ | 0 | 0 | 0 | 0 | 0 |
| $-z_{57}^*$ | 0 | $z_{55}^*$ | $z_{56}$ | 0 | $-z_{60}^*$ | 0 | 0 | 0 | 0 | 0 | 0 |
| 0 | $z_{57}^*$ | $-z_{56}^*$ | $z_{55}$ | 0 | 0 | 0 | 0 | 0 | 0 | 0 | 0 |

METHOD AND ARRANGEMENT FOR DIGITAL SIGNAL TRANSMISSION USING LAYERED SPACE-TIME CODES

CROSS REFERENCE TO RELATED APPLICATIONS

This application is a divisional of patent application Ser. No. 09/676,373, entitled "Method and System for Digital Signal Transmission," filed on Sep. 29, 2000, now U.S. Pat. No. 6,865,237 which application is incorporated herein by reference.

This application claims priority under 35 U.S.C. Section 119 based on Finnish Application Serial Number 20000406 filed on Feb. 22, 2000, which has been filed as co-pending U.S. application Ser. No. 10/225,457 and Finnish Application Serial Number 20001944 filed on Sep. 4, 2000, which has been filed as co-pending U.S. application Ser. No. 10/378,068. This application is also related to and claims priority to U.S. Provisional Application No. 60/193,402 filed on Mar. 29, 2000, entitled "CLASS OF SPACE-TIME BLOCK CODES FOR MORE THAN TWO ANTENNAS" all assigned to assignee of present application and all incorporated herein by reference.

FIELD OF THE INVENTION

This invention relates generally to methods and systems for achieving transmit diversity in a telecommunication system. More particularly, the present invention relates to an apparatus and associated method for using a space-time block code to reduce bit error rates of a wireless communication in a spread spectrum receiver.

Mathematical Foundations

The review of mathematical tools, nomenclature, and notations follows which is intended to be used for an understanding of the present invention. Multiple notations may be used in same parts of the application to better describe the invention. Other mathematical techniques, nomenclature, and notations may be used to describe the present invention without departing from the spirit and scope thereof.

A vector may be represented in Dirac notation proposed by P.A.M. Dirac:
Bra $<a|$ which may be represented by a row matrix $\alpha_j = [\alpha_1, \alpha_2, \alpha_3]$;
Ket $|b>$ which may be represented by a column matrix $$\beta_i = \begin{bmatrix} \beta_1 \\ \beta_2 \\ \beta_3 \end{bmatrix}; \text{ and}$$

C is defined as $$I = \sum_i |i\rangle\langle i|.$$

Thus BraCKet notation is an analogy with the dot product $$A \cdot B = \sum_i A_i B_i.$$

Definition: The inner product of two vectors in a vector space V is a complex number, such that $$<a|b> = <b|a>^*$$

$$<a|(\beta|b>+\gamma|c>) = \beta<a|b>+\gamma<a|c>$$

$$<a|a> \geq 0, \text{ and } <a|a>=0 \text{ iff} |a>=0.$$

Therefore, the inner product may be defined in summation notation as $$\langle a|b\rangle \equiv \alpha_1^*\beta_1 + \alpha_2^*\beta_2 + \ldots + \alpha_n^*\beta_n = \sum_{i=1}^n \alpha_i^*\beta_i.$$

A state vector may be represented as a linear combination with suitable coefficients of a set of base vectors i, j:

$$\langle i|a\rangle = C_i \Leftrightarrow |a\rangle = \sum_i |i\rangle C_i$$

$$\langle i|b\rangle = D_i \Leftrightarrow |b\rangle = \sum_i |i\rangle D_i$$

$$\langle a|i\rangle = \langle i|a\rangle^*$$

$$\langle b| = \sum_j D_j^* \langle j|$$

$$\langle b|a\rangle = \sum D_j^* \langle j|i\rangle C_i$$

but $$\langle i|j\rangle = \delta_{ij} \equiv \begin{Bmatrix} 1 & \text{if } i=j \\ 0 & \text{if } i \neq j \end{Bmatrix}$$

(the Kronecker delta $\delta_{ij}$) is a symbol that is defined to be 0 for $i \neq j$ and to be 1 when $i=j$ and can be represented by the unit matrix $$\begin{pmatrix} 1 & 0 \\ 0 & 1 \end{pmatrix}$$

which may also be referred to as the Identity matrix $I_2$ or for an N dimension basis $I_N$. The vectors i and j are normalized and form an orthonormal basis. Sometimes $\{|e_i\rangle\}_{i=1}^N$ is used as a basis in a N-dimensional vector space.

Vectors $|a\rangle, |b\rangle \in V$ are orthogonal if $<a|b>=0$.

Operators can be represented as:

$$A_{ij} \equiv \langle i|A|j\rangle = \begin{bmatrix} A_{11} & A_{12} & \cdots & \cdots & A_{1j} \\ A_{21} & A_{22} & \cdots & \cdots & A_{2j} \\ \vdots & \vdots & \ddots & \vdots & \vdots \\ \vdots & \vdots & \vdots & \ddots & \vdots \\ A_{i1} & A_{i2} & \cdots & \cdots & A_{ij} \end{bmatrix}$$

$|b\rangle = A|a\rangle$ operator A performs operation on vector state $|a\rangle$ to produce vector state $|b\rangle$, $$\langle i|b\rangle = \sum_j \langle i|A|j\rangle\langle j|a\rangle.$$

<b|A|a>*=<a|A$^H$|b> where A$^H$ is an operator whose matrix elements are A$_{ij}^H$=(A$_{ji}$)* and is called Hermitian when A$^H$=A.

A system may be represented in terms of the unit matrix and a set of matrices:

$$M = \begin{bmatrix} a & b \\ c & d \end{bmatrix} = a\begin{pmatrix} 1 & 0 \\ 0 & 0 \end{pmatrix} + b\begin{pmatrix} 0 & 1 \\ 0 & 0 \end{pmatrix} + c\begin{pmatrix} 0 & 0 \\ 1 & 0 \end{pmatrix} + d\begin{pmatrix} 0 & 0 \\ 0 & 1 \end{pmatrix}$$

An example of such a set of matrices is called Pauli-Spin matrices:

$$\sigma_z = \begin{pmatrix} 1 & 0 \\ 0 & -1 \end{pmatrix}, \sigma_x = \begin{pmatrix} 0 & 1 \\ 1 & 0 \end{pmatrix}, \text{ and } \sigma_y = \begin{pmatrix} 0 & -i \\ i & 0 \end{pmatrix}.$$

$$\sigma_x^2 = 1, \sigma_y^2 = 1, \sigma_z^2 = 1. \ \sigma_x\sigma_y = -\sigma_y\sigma_x = i\sigma_z,$$

$$\sigma_y\sigma_z = -\sigma_z\sigma_y = i\sigma_x, \text{ and}$$

$$\sigma_z\sigma_x = -\sigma_x\sigma_z = i\sigma_y.$$

The present application will also use the mathematical methods of group theory and algebras. Simply, a group is a set G of elements g together with a binary operation called multiplication with the properties:

∃ϵ∈G∋ϵ*g=g*ϵ=g and ∀g∈G,∃g$^{-1}$∋g*g$^{-1}$=g$^{-1}$*g=ϵ which reads in other words: there exist an unique element ϵ of the group G such that ϵ operating on g equals g operating on ϵ equals g (the element ϵ is referred to as the identity); and for every element g belonging to group G, there exists an element g$^{-1}$ (called the inverse) such that g operating on g-inverse equals g-inverse operating on g equals the identity ϵ.

A set of linearly independent vectors may be represented as group elements, a vector space may be generated by taking a linear combination of the elements of the set. The product already defined on the basis set can be extended to all the elements of the vector space by linearity defining a group algebra. The Pauli-Spin matrices may be thought of as group elements.

BACKGROUND OF THE INVENTION

As wireless communication systems evolve, wireless system design has become increasingly demanding in relation to equipment and performance requirements. Future wireless systems, which will be third generation (3G) systems and fourth generation systems compared to the first generation analog and second generation digital systems currently in use, will be required to provide high quality high transmission rate data services in addition to high quality voice services. Concurrent with the system service performance requirements will be equipment design constraints, which will strongly impact the design of mobile terminals. The third and fourth generation wireless mobile terminals will be required to be smaller, lighter, more power-efficient units that are also capable of providing the sophisticated voice and data services required of these future wireless systems.

Time-varying multi-path fading is an effect in wireless systems whereby a transmitted signal propagates along multiple paths to a receiver causing fading of the received signal due to the constructive and destructive summing of the signals at the receiver. This occurs regardless of the physical form of the transmission path, (i.e. whether the transmission path is a radio link, an optical fiber or a cable). Several methods are known for overcoming the effects of multi-path fading, such as time interleaving with error correction coding, implementing frequency diversity by utilizing spread spectrum techniques, transmitter power control techniques, and the like. Each of these techniques, however, has drawbacks in regard to use for third and fourth generation wireless systems. Time interleaving may introduce unnecessary delay, spread spectrum techniques may require large bandwidth allocation to overcome a large coherence bandwidth, and power control techniques may require higher transmitter power than is desirable for sophisticated receiver-to-transmitter feedback techniques that increase mobile station complexity. All of these drawbacks have negative impact on achieving the desired characteristics for third and fourth generation mobile terminals. Diversity is another way to overcome the effects of multi-path fading.

Antenna diversity is one type of diversity used in wireless systems. In antenna diversity, two or more physically separated antennas are used to receive a signal, which is then processed through combining and switching to generate a received signal. A drawback of diversity reception is that the physical separation required between antennas may make diversity reception impractical for use on the forward link in the new wireless systems where small mobile station size is desired.

A second technique for implementing antenna diversity is transmit (Tx) diversity. In transmit (Tx) diversity, a signal is transmitted from two or more antennas and then processed at the receiver by using maximum likelihood sequence estimator (MLSE) or minimum mean square error (MMSE) techniques. Transmit diversity has more practical application to the forward link in wireless systems in that it is easier to implement multiple antennas in the base station than in the mobile terminal. FIG. 1 is an illustration showing an example of a transmit diversity system. Transmit (Tx) diversity system 100 comprises multiple transmit antennas (Tx$_1$ ... Tx$_n$; n=1 to N) 110, multiple channels (h$_1$ ... h$_K$) 120 where h$_k$=α$_k$e$^{jΘ_k}$ ∀k=1 to K, and receiving antenna Rx 130. Channel interference may be created by structures or other features 140 among various channel paths.

Use of Space-Time Block Code (STBC) aka Space-Time Code (STC) may be considered as diversity-creating. In space-time block code design, the essential design criteria are the achieved diversity, the rate of the code, and the delay. Diversity is characterized by the number of independently decodable channels. For full diversity, this equals the number of transmit antennas. The rate of the code is the ratio of the space-time coded transmission rate to the rate of an one-antenna transmission (i.e. the ratio of the transmission rate of the block code to transmission rate of the uncoded scheme). The delay is the length of the space-time block code frame. Depending on the underlying modulation scheme, space-time block codes may be divided into real and complex codes. Rate in the context of space-time block code may be understood as inefficiency in use of the antenna resources, leading to dilution of maximal bit-rates as compared to the inherent capacity of the underlying wireless system specifications. This inefficient use of antenna resources may give rise to fluctuating of transmit powers.

Such fluctuation of transmit powers is referred to as the power-unbalance problem. Thus, the aims in the design of space-time block codes is to achieve unit rate (R=1) in order to use antenna resources as efficiently as possible. The aim of diversity is to achieve maximal diversity.

Transmit diversity for the case of two antennas (N=2) is well studied. Both open-loop and closed-loop transmit diversity methods have been under consideration for 3G Wide-band Code Division Multiple Access (WCDMA) system.

An example of an open-loop concept is provided by Alamouti, who proposed a method of transmit diversity employing two antennas that offers second order diversity for complex valued signals. (S. M. Alamouti, "A Simple Transmit Diversity Technique for Wireless Communications," IEEE Journal on Selected Areas of Communications, vol. 16, no. 8, pp. 1451-1458, October 1998 and publication WO 99/14871 of ALAMOUTI et al. entitled "Transmitter Diversity Technique for Wireless Communication") The Alamouti method employs two transmit antennas, has a rate R=1 and a maximum-ratio diversity-combining detector.

The method achieves effective communication by encoding symbols that comprise negations and conjugation of symbols (i.e. negation of imaginary parts) and simultaneously transmitting two signals (K=2) from two antennas (N=2) to a receiving antenna (Rx) during a symbol period (T) also referred to as a time epoch. During one symbol period ($T_1=t_0+T$), the signal transmitted from a first antenna ($Tx_1$) is denoted by $s_1$ and the signal transmitted from the second antenna ($Tx_2$) is denoted by $s_2$, where $s_1$ and $s_2$ are complex numbers. During the next symbol period ($T_2=T_1+T$), the signal $-s_2^*$ (negation/conjugate) is transmitted from the first antenna ($Tx_1$) and the signal $s_1^*$ (conjugate) is transmitted from the second antenna ($Tx_2$), where * is the complex conjugate operator.

TABLE 1

| Period | Trans. Ant. 1 ($Tx_1$) | Trans Ant. 2 ($Tx_2$) | Receive Ant. (Rx) |
|---|---|---|---|
| $T_1$ | $s_1$ | $s_2$ | $r_1$ |
| $T_2$ | $-s_2^*$ | $s_1^*$ | $r_2$ |

The baseband signals during a first interval can be written as:

$$r_1 = h_1 s_1 + h_2 s_2 + n_1 \quad (1)$$

$$r_2 = -h_2 s_2^* + h_1 s_1^* + n_2^* \quad (2)$$

where $n_1$ and $n_2$ are noise factors and let us assume impulse response coefficients, e.g. flat-fading case $h_i$, where i=1 to K associated with the two antennas (K=2) are constant over the two-symbol time interval.

We can map the table into matrix form with the columns correspond to antennas and the row to time epochs, where the column index represents or is associates with the antenna index and the row index represents or is associated with the time index. Thus, the Alamouti Space-Time Block code (STBC)

$$C_{Ala} = \underset{e}{\overset{t}{m}} \begin{bmatrix} s_1 & s_2 \\ -s_2^* & s_1^* \end{bmatrix} \quad (3)$$

$$\underset{\downarrow}{}$$

is optimal with complex signal constellations. It reaches diversity 2, with a linear decoding scheme which yields estimates for both symbols with the two channels maximal ratio combined.

The impulse response coefficients can be represented by $$h = |h\rangle = \begin{bmatrix} h_1 \\ h_2 \end{bmatrix}$$

and the received signals by $$r = |r\rangle = \begin{bmatrix} r_1 \\ r_2 \end{bmatrix}$$

and the noise by $$n = |n\rangle = \begin{bmatrix} n_1 \\ n_2 \end{bmatrix}.$$

The signal received at Rx 130 is given by:

$$\begin{bmatrix} r_1 \\ r_2 \end{bmatrix} = C_{Ala} \begin{bmatrix} h1 \\ h2 \end{bmatrix} + n \Leftrightarrow |r\rangle = \langle h_i | C | h_j \rangle + |n\rangle \quad (4)$$

or, equivalently;

$$\begin{bmatrix} r_1 \\ r_2^* \end{bmatrix} = \begin{bmatrix} h_1 & h_2 \\ h_2^* & -h_1^* \end{bmatrix} \begin{bmatrix} s_1 \\ s_2 \end{bmatrix} + \begin{bmatrix} n_1 \\ n_2^* \end{bmatrix} \Leftrightarrow r = H_{12} s + n \quad (5)$$

There is interest to derive space-time codes (STC) for more than two antennas. However, extension of the Alamouti method to more than two antennas is not straightforward. Note that the channel matrix $H_{12}$ in equation (5) is orthogonal, thus to decode we use:

$$s = H_{12}^H r \quad (6)$$

The detection is:

$$\hat{s} = \text{sign}(H_{12}^H r) = \text{sign}[(\|h_1\|^2 + \|h_2\|^2)I_2 s + H_{12}^H n] \quad (7)$$

The $C_{Ala}$ matrix may be recognized as proportional to a general unitary unimodular matrix which is commonly written in the art as:

$$U(a, b) = \begin{bmatrix} a & b \\ -b^* & a^* \end{bmatrix} \quad (8)$$

where a and b are complex numbers which satisfy the unimodular condition $|a|^2+|b|^2=1$. The orthogonality of the space-time block codes may thus be expressed as $$C^H C = \sum_i |z_i|^2 I \quad (9)$$

C is the code matrix, I is the identity matrix of the same dimension, and the superscript H is the hermitean operator (complex conjugate transpose). The maximum-ratio-combining property of the code is a direct consequence of the appearance of the sum of the symbol powers on the diagonal of the hermitean square of the code matrix.

In general, the Alamounti STBC is the Radon-Hurwitz submatrix form and is an unitary unimodular matrix given in general form by:

$$C_{RH} = \begin{bmatrix} c_n & c_{n+1} \\ -c_{n+1}^* & c_n^* \end{bmatrix} \quad (10)$$

The mathematical work of Radon and Hurwitz in the 1920's is cited in Calderbank et al. in U.S. Pat. No. 6,088,408 issued to Calderbank et al. on Jul. 11, 2000 and in V. Tarokh, H. Jafarkhani, and A. Calderbank, "*Space-Time Block Codes from Orthogonal Designs,*" *IEEE Transactions on Information Theory*, pp. 1456-1467, July 1999, both incorporated herein by reference, showed the Hurwitz-Radon proof and showed that for more than two antennas complex orthogonal designs that achieve R=1 do not exist Calderbank et al. proposed a method using rate=1/2, and 3/4 Space-Time Block codes for transmitting on three and four antennas using complex signal constellations.

As an example, the code rate 3/4 is given by:

$$C_{3/4}(s_1, s_2, s_3) = \quad (11)$$

$$\begin{bmatrix} s_1 & s_2 & \frac{s_3}{\sqrt{2}} & \frac{s_3}{\sqrt{2}} \\ -s_2^* & s_1^* & \frac{s_3}{\sqrt{2}} & -\frac{s_3}{\sqrt{2}} \\ \frac{s_3^*}{\sqrt{2}} & \frac{s_3^*}{\sqrt{2}} & \frac{(s_2 - s_2^* - s_1 - s_1^*)}{2} & \frac{(s_1 - s_1^* - s_2 - s_2^*)}{2} \\ \frac{s_3^*}{\sqrt{2}} & -\frac{s_3^*}{\sqrt{2}} & \frac{(s_1 - s_1^* + s_2 + s_2^*)}{2} & -\frac{(s_1 + s_1^* + s2 - s_2^*)}{2} \end{bmatrix}$$

This method has a disadvantage in a loss in transmission rate and the fact that the multi-level nature of the ST coded symbols increases the peak-to-average ratio requirement of the transmitted signal and imposes stringent requirements on the linear power amplifier design. Other methods proposed include a rate (R=1), orthogonal transmit diversity (OTD)+ space-time transmit diversity scheme (STTD) four antenna method.

When complex modulation is used, full diversity codes with a code rate 1 are only described in connection with two antennas in the publication WO 99/14871 Published on Mar. 25, 1999 and entitled TRANSMITTER DIVERSITY TECHNIQUE FOR WIRELESS COMMUNICATIONS and the publication Tarokh, V., Jafarkhani, H., Calderbank, A. R.: Space-Time Block Coding for Wireless Communications: Performance Results, IEEE Journal on Selected Areas In Communication, Vol. 17 pp. 451-460, March 1999, both incorporated herein by reference present a rate 1/2 code which is constructed from the full rate real code by setting the complex signals on top of the same, but conjugated signals. This way rate 1/2 codes for two to eight antennas are obtained. In the following, an example of a code for three antennas is given:

$$C_{1/2}(s_1, s_2, s_3, s_4) \rightarrow \begin{bmatrix} s_1 & s_2 & s_3 \\ -s_2 & s_1 & -s_4 \\ -s_3 & s_4 & s_1 \\ -s_4 & -s_3 & s_2 \\ s_1^* & s_2^* & s_3^* \\ -s_2^* & s_1^* & -s_1^* \\ -s_3^* & s_4^* & s_1^* \\ -s_4^* & -s_3^* & s_2^* \end{bmatrix} \quad (12)$$

where a star (*) refers to a complex conjugate. These codes are not delay-optimal.

So far, all complex space-time block codes have belonged to two categories: a group based on real codes, halving the code rate, such as the above example, or a group based on square unitary matrices.

It is desirable that 'Open-loop diversity' should have these four properties:

1. Full diversity in regard to the number of antennas.
2. Only linear processing is required in a transmitter and a receiver.
3. Transmission power is divided equally between the antennas.
4. The code rate efficiency is as high as possible.

A drawback of the above solutions is that only the requirements 1 and 2 can be fulfilled. For example, the transmission power of different antennas is divided unequally, (i.e. different antennas transmit at different powers). This causes problems in the planning of output amplifiers. Furthermore, the code rate is not optimal.

For 3 and 4 antennas, this maximal rate is 3/4. Because of the inefficiency of codes with rates less than one (R<1) transmit power of a given antenna fluctuates in time; thus, presenting a power-unbalanced problem. Therefore, there is a need to provide a power-balance full-rate code. Since a decrease in rate may not acceptable, some other features of space-time block codes have to be relaxed.

For example, uncoded diversity gain may be sacrificed and rely on coding to exploit the diversity provided by additional antennas. Motorola introduced Orthogonal Transmit Diversity+Space-Time Transmit Diversity (OTD+ STTD) scheme, (L. Jalloul, K. Rohani, K. Kuchi, and J. Chen, "Performance Analysis of CDMA Transmit Diversity Methods," Proceedings of IEEE Vehicular Technology Conference, vol. 3, pp. 1326-1330 Fall 1999, hereinafter referred to as Jalloul). Jalloul states that extension of OTD to more than two antennas is straightforward; but "STTD is not directly extendable to more than two antennas, since rate one S-T block codes (STC) are non-existent for greater that 2 antennas." They extended the two antenna STTD scheme to four transmit antennas by combining the STTD with two-branch OTD, $$C_{STOTD}(s_1, s_2, s_3, s_4) = \begin{bmatrix} s_1 & s_2 & s_1 & s_2 \\ -s_2^* & s_1^* & -s_2^* & s_1^* \\ s_3 & s_4 & s_3 & s_4 \\ -s_4^* & s_3^* & -s_4^* & s_3^* \end{bmatrix} \quad (13)$$

The STOTD scheme is completely balanced and is also orthogonal, so that linear decoding gives maximal likelihood results. However, the diversity order achieved is only two, which is the same as the Alamouti STTD scheme.

Space-Time Code Design Criteria

There are three design criteria for space-time block codes, which are all formulated in terms of the codeword difference matrix $D_{ce}=C_c-C_e$, where $C_c$ and $C_e$ are the code matrices corresponding to two distinct sets of information c and e. Minimizing the pair-wise error probability of deciding in favor of $C_e$ when transmitting $C_c$ leads to the following design criteria:

1. The rank criterion: The diversity gained by a multiple transmitter scheme Is:

diversity=$\min_{e \neq c}$ Rank[$D_{ce}$]<=min[$T;N$]  (14)

To achieve maximal diversity, $D_{ce}$ should have full rank for all distinct code words c and e.

2. The determinant criterion: To optimize performance in a Rayleigh fading environment, Code (C) should be designed to maximize $\min_{e \neq c}$det'[$D_{ce}^H D_{ce}$].  (15)

Where the prime in the determinant indicates that zero eigenvalues should be left out from the product of eigenvalues when computing the determinant.

3. The trace criterion: To optimize performance in flat fading channels, Code (C) should be designed to maximize the Euclidean distance Tr[$D_{ce}^H D_{ce}$].  (16)

Moreover, to optimize performance in fading channels, the eigenvalues of $D_{ce}^H D_{ce}$ should be as close to each other as possible.

From linearity, it follows that the codeword difference matrix $D_{ce}$ inherits the unitarity property of the code matrix C:

$$D_{ce}^H D_{ce} = \sum_k |z_{k,c} - z_{k,e}|^2 I_N. \quad (17)$$

Thus, all design criteria are fulfilled:

Rank criterion: As an unitary matrix, $D_{ce}$ is full rank for all distinct code word pairs. Thus, all space-time block codes give full diversity, equaling the number of Tx antennas.

Determinant criterion: As $D_{ce}$ is unitary, $$\det|D_{ce}^H D_{ce}| = \sum_k |z_{k,c} - z_{k,e}|^{2N} \quad (18)$$

This is the maximum given a fixed transmit power.

Trace criterion: As $D_{ce}$ is unitary, $$Tr|D_{ce}^H D_{ce}| = N \sum_k |z_{k,c} - z_{k,e}|^2.$$

This is the maximum given a fixed transmit power. Moreover, all eigenvalues are the same.

Thus, there is a need for a design which provides full, diversity, full rate and power-balanced space-time codes.

SUMMARY OF THE INVENTION

It is thus an object of the invention to implement a method and a system by which optimal diversity is achieved with different numbers of antennas. This is achieved by a method of transmitting a digital signal consisting of symbols, which method comprises the steps of coding complex symbols to channel symbols in blocks having the length of a given K and transmitting the channel symbols via several different channels and two or more antennas. In the method of the invention, coding is performed such that the coding is defined by a code matrix, which can be expressed as a sum of 2K elements, in which each element is a product of a symbol or symbol complex conjugate to be transmitted and a N×N representation matrix of a complexified anti-commutator algebra, extended by a unit element, and in which each matrix is used at most once in the formation of the code matrix.

Further, in the method of the invention the coding is performed such that the coding is defined by a code matrix which is formed by freely selecting 2K−1 unitary, anti-hermitean N×N matrices anti-commuting with each other, forming K−1 pairs of said matrices, whereby the remaining matrix forms a pair with an N-dimensional unit matrix, forming two matrices of each pair such that the second matrix of the pair, multiplied by the imaginary unit, is added to and subtracted from the first matrix of the pair, and in which each matrix formed in the above manner defines the dependence of the code matrix on one symbol or symbol complex conjugate to be coded.

The invention also relates to an arrangement for transmitting a digital signal consisting of symbols, which arrangement comprises a coder for coding complex symbols to channel symbols in blocks having the length of a given K, means for transmitting the channel symbols via several different channels and two or more antennas. In the arrangement of the invention, the coder is arranged to code the symbols using a code matrix, which can be expressed as a sum of 2K elements, in which each element is a product of a symbol or symbol complex conjugate to be transmitted and a a N×N representation matrix of a complexified anti-commutator algebra, extended by a unit element, and in which each matrix is used at most once in the formation of the code matrix.

Furthermore, in the arrangement of the invention the coder is arranged to code the symbols using a code matrix which is formed by freely selecting 2K−1 unitary, anti-hermitean N×N matrices anti-commuting with each other, forming K−1 pairs of said matrices, whereby the remaining matrix forms a pair with an N-dimensional unit matrix, forming two matrices of each pair such that the second matrix of the pair, multiplied by the imaginary unit, is added to and subtracted from the first matrix of the pair, and in which each matrix formed in the above manner defines the dependence of the code matrix on one symbol or symbol complex conjugate to be coded.

The solution of the invention can provide a system in which any number of transmit and receive antennas can be used and a full diversity gain can be achieved by space-time block coding. In a preferred embodiment, the maximal code rate and the optimal delay are achieved by square codes having a dimension that is a power of two.

The solution of the invention employs complex block codes. In a preferred embodiment codes are used, which are based on matrices whose all elements have the form of $\pm s_k$, $\pm s^*_k$ or 0. The prior art solutions reveal no codes in whose elements the term 0 appears. First, square codes are given, from which non-square codes are obtained by eliminating columns (antennas). In these codes known as basic codes the elements depend only on one symbol, or on the real part of a symbol and the imaginary part of another symbol. In another preferred embodiment, full diversity codes which do not have the above restriction can be used.

Also provided is a method and arrangement in which a code matrix is formed by matrices of a portion of the symbols placed on the diagonal of the code matrix and by matrices of a second portion of symbols along the anti-diagonal of the code matrix.

A sub-optimal solution is also provided by an embodiment of the invention using a rate 1/3 convolution code.

An equal distribution of transmission power between different antennas is also achieved by means of the solution of the invention. The solution of the invention preferably also provides coding in which the ratio of the maximum power to the average power or the ratio of the average power to the minimum power can be minimized.

At the receiver, the transmitted symbols may be recovered using a maximum likelihood sequence estimator (MLSE) decoder implemented with the Viterbi algorithm with a decoding trellis according to the transmitter.

A BRIEF DESCRIPTION OF THE DRAWINGS

The above set forth and other features of the invention are made more apparent in the ensuing Detailed Description of the Invention when read in conjunction with the attached Drawings, wherein:

FIG. 5 shows a rate 63/64 three-layer block code for four antennas; and

DETAILED DESCRIPTION

The invention may be used in radio systems which allow the transmission of at least a part of a signal by using at least three or more transmit antennas or three or more beams that are accomplished by any number of transmit antennas. A transmission channel may be formed by using a time division, frequency division or code division multiple access method. Also systems that employ combinations of different multiple access methods are in accordance with the invention. The examples describe the use of the invention in a universal mobile communication system utilizing a broadband code division multiple access method implemented with a direct sequential technique, yet without restricting the invention thereto.

Figure 2A:
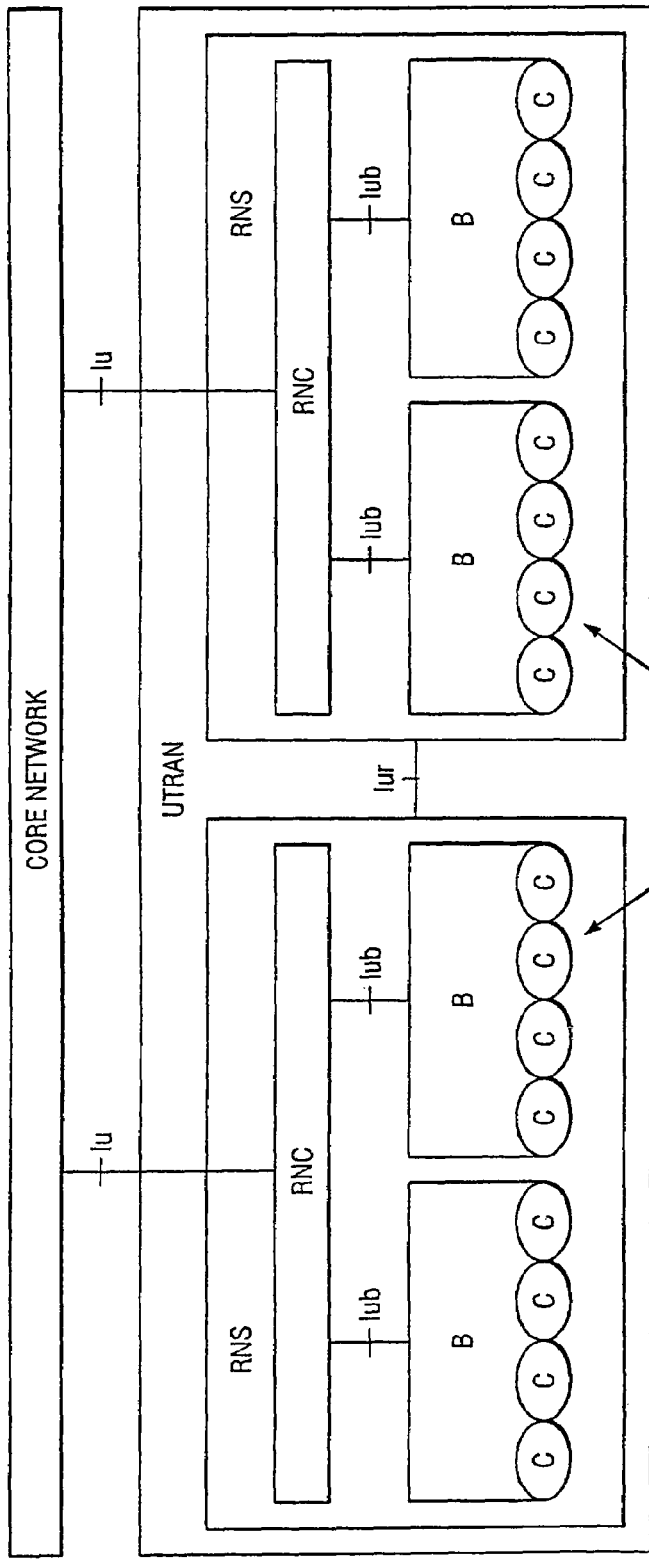
FIG. 2A shows an example of a system in accordance with an embodiment of the invention.

Referring to FIG. 2A, a structure of a mobile communication system is described by way of example. The main parts of the mobile communication system are core network CN, UMTS terrestrial radio access network UTRAN and user equipment UE. The interface between the CN and the UTRAN is called Iu and the air interface between the UTRAN and the UE is called Uu.

The UTRAN comprises radio network subsystems RNS. The interface between the RNSs is called Iur. The RNS comprises a radio network controller RNC and one or more nodes B. The interface between the RNC and B is called Iub. The coverage area, or cell, of the node B is marked with C in the figure.

Figure 2B:
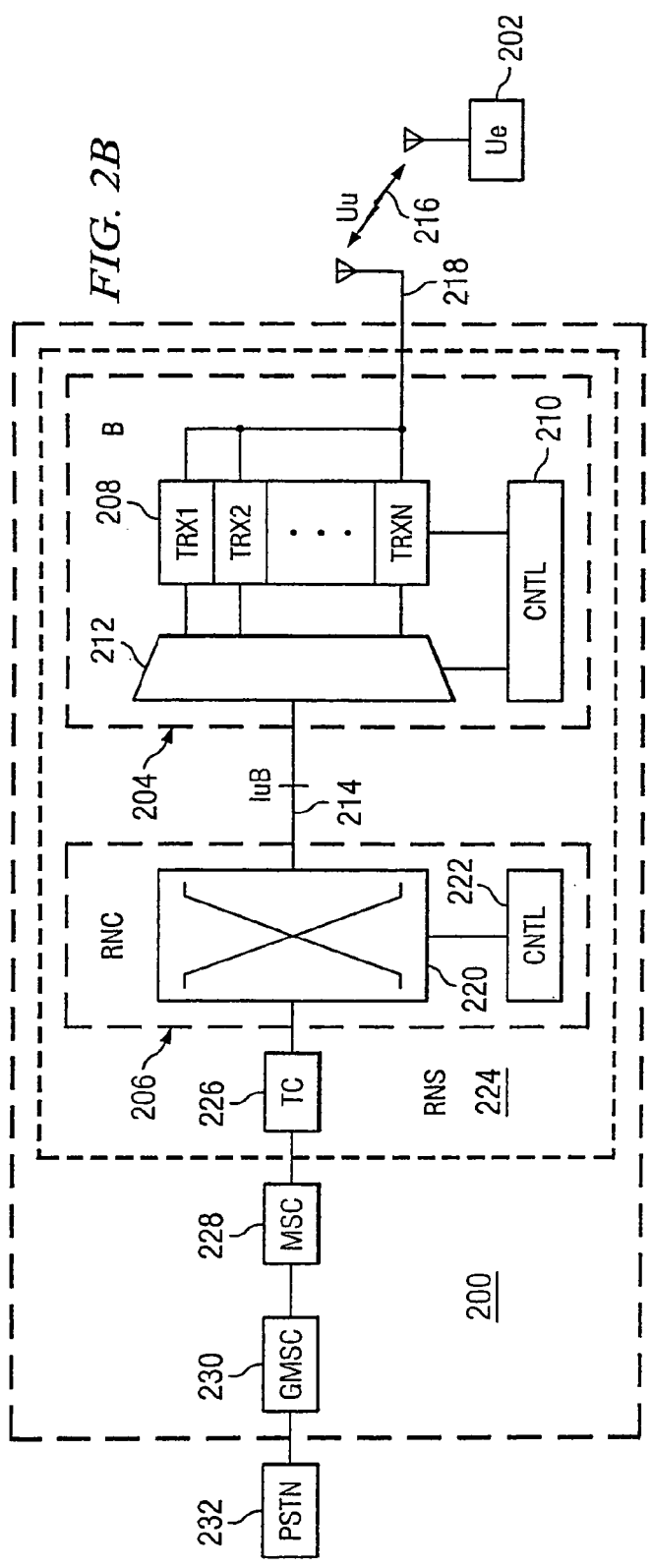
FIG. 2B shows another example of a system in accordance with an embodiment of the invention.

The description of FIG. 2A is relatively general, and it is clarified with a more specific example of a cellular radio system in FIG. 2B. FIG. 2B includes only the most essential blocks, but it is obvious to a person skilled in the art that the conventional cellular radio system also includes other functions and structures, which need not be further explained herein. It is also to be noted that FIG. 2B only shows one exemplified structure. In systems according to the invention, details can be different from what is shown in FIG. 2B, but as to the invention, these differences are not relevant.

A cellular radio network typically comprises a fixed network infrastructure, i.e. a network part 200, and user equipment 202, which may be fixedly located, vehicle-mounted or portable terminals. The network part 200 comprises base stations 204, a base station corresponding to a B-node shown in the previous figure. A plurality of base stations 204 are, in turn, controlled in a centralized manner by a radio network controller 206 communicating with them. The base station 204 comprises transceivers 208 and a multiplexer 212.

The base station 204 further comprises a control unit 210 which controls the operation of the transceivers 208 and the multiplexer 212. The multiplexer 212 arranges the traffic and control channels used by several transceivers 208 to a single transmission connection 214, which forms an interface Iub.

The transceivers 208 of the base station 204 are connected to an antenna unit 218 which is used for implementing a bi-directional radio connection 216 to the user equipment 202. The structure of the frames to be transmitted in the bi-directional radio connection 216 is defined separately in each system, the connection being referred to as an air interface Uu.

The radio network controller 206 comprises a group switching field 220 and a control unit 222. The group switching field 220 is used for connecting speech and data and for combining signalling circuits. The base station 204 and the radio network controller 206 form a radio network subsystem 224 which further comprises a transcoder 226. The transcoder 226 is usually located as close to a mobile services switching center 228 as possible, because speech can then be transferred in a cellular radio network form between the transcoder 226 and the radio network controller 206, which saves transmission capacity.

The transcoder 226 converts different digital speech coding forms used between a public switched telephone network and a radio network to make them compatible, for instance from a fixed network form to another cellular radio network form, and vice versa. The control unit 222 performs call control, mobility management, collection of statistical data and signalling.

FIG. 2B further shows the mobile services switching center 228 and a gateway mobile services switching center 230 which controls the connections from the mobile communications system to the outside world, in this case to a public switched telephone network 232.

In accordance with the present invention there is provided a sub-optimal class of Space-Time Codes (STC) based on the Radon-Hurwitz sub-matrix. The invention can thus be applied particularly to a system in which signal transmission is carried out by using 'complex space-time block coding' in which the complex symbols to be transmitted are coded to channel symbols in blocks having the length of a given K in order to be transmitted via several different channels and two or more antennas. These several different channels can be formed of different time slots. As a result of the coding, the symbol block forms into a code matrix in which the number of columns corresponds to the number of antennas used for the transmission and the number of rows corresponds to the number of different channels, which, in case of space-time coding, is the number of time slots to be used. Correspondingly, the invention can be applied to a system in which different frequencies or different spreading codes are used instead of time slots. In this case it does not naturally deal with space-time coding but rather with space-frequency coding or space-code-division coding. The space-frequency coding could be used in an OFDM (orthogonal frequency division multiplexing) system, for example.

The codes of the present invention have rate R=1 and are easily decodable. For the 4-antenna case, a diversity of order 3 is achieved. The present invention minimizes the inherent non-orthogonality and have simple linear decoding, which may be iterated. The present invention is also backward compatible with 3GPP release 99 open-loop diversity mode.

Let us first examine the forming of a freely selected square complex space-time block code. Assuming the number of transmit antennas is $N=2^{K-1}$, where K is an integer and bigger than two. By means of the obtained code, K complex number modulated symbols can be transmitted during N symbol periods. These symbols can be marked with $s_k$, k=1, ... K.

A square complex space-time block code is based on a unitary N×N matrix, whose elements depend on linearly transmitted symbols $s_k$ and their complex conjugates. A unitary matrix is a square matrix whose inverse matrix is proportional to its hermitean conjugate. On the other hand, the hermitean conjugate is the complex conjugate of the matrix transpose. In addition, the proportional coefficient between the product of the code matrix and its hermitean conjugate, and the unit matrix is a linear combination of the absolute value squares of the symbols to be transmitted. This linear combination can be called unitarity coefficient. By interpreting the symbols to be transmitted appropriately, this linear combination can always be seen as a sum of the absolute value squares of the symbols to be transmitted.

The unitarity (complex-orthogonality) of the space-time block codes may thus be expressed with the inner products proportional to the sum of the squared amplitudes of the symbols:

$$C^H C = \sum_i |z_i|^2 I \quad (19)$$

C is the code matrix, I is the identity matrix of the same dimension, and H is the hermitean conjugate (complex conjugate transpose operator). The maximum-ratio-combining property of the code is a direct consequence of the appearance of the sum of the symbol powers on the diagonal of the hermitean square of the code matrix.

The linearity of the symbols $z_1$, $z_2$ allows the code matrix to be expanded thus $$C = \sum_{k=1}^{K} (z_k \beta_k^- + z_k^* \beta_k^+) \quad (20)$$

$$= \sum_{k=1}^{K} (x_k \beta_{2k-2} + y_k \beta_{2k-1}). \quad (21)$$

$$\{\beta\}_{k=0}^{2K-1}$$

is a set of 2K constant T×N matrices with complex entries. The real variable $x_k$ and $y_k$ are the real and imaginary part of the complex variable $z_k = x_k + i y_k$, and the matrices $\beta_k^\pm$ are linear combination of $\beta_k$ $$\beta_k^\pm = \frac{1}{2}(\beta_{2k-2} \pm j\beta_{2k-1}). \quad (22)$$

Combining the above based on unitarity and linearity criteria the following is a restriction on the $\beta_k$ matrices.

$$\beta_k^H \beta_j + \beta_j^H \beta_k = 2\delta_{jk} I_N. \quad (23)$$

For square matrices (T=N), it can be seen the code matrix C(z) and the coefficient matrices $\beta_k$ are unitary which lends itself to the use of group algebras. Moreover, the matrices belong to the unitary group U(N).

As stated above in regards to Pauli-Spin matrices, taking a set of linearly independent vectors as group elements, a vector space may be generated by taking a linear combination of the elements of the set. The product already defined on the basis set can be extended to all the elements of the vector space by linearity. Thus, defining a group algebra. Due to this, the well developed tools of the representation theory of continuous groups lend themselves to the analysis of the problem.

Redefine $$\gamma_k = \beta_k^H \beta_k; \ k=0, \ldots, 2K-1, \quad (24)$$

$\gamma_0 = I_N$, and the algebra $\beta_k^H \beta_j + \beta_j^H \beta_k = 2\delta_{jk} I_N$ from above remains unchanged for the γ:s. From the relation between $\gamma_0$ and the other γ:s, we then see that these should be antihermitean $$\gamma_k^H = -\gamma_k, \ k=1, \ldots, 2K-1, \quad (25)$$

The algebra of these remaining γ:s is now $$\gamma_k \gamma_j + \gamma_j \gamma_k = -2\delta_{jk} I_N, \ j, k=1, \ldots, 2K-1. \quad (26)$$

$\gamma_k \gamma_j$

This is the defining relation of generators of the Clifford algebra. There is a coincidence that the investigation of the Clifford algebra originates in the work of theoretical physicist P.A.M. Dirac on fermionic particles in space-time. From a group theoretical point of view, the γ-matrices generate the so-called spinor representation of the special orthogonal subgroup SO(2K−1), and here we are dealing with the problem of embedding spinorial SO(2K−1) representation in representations of unitary groups.

We thus get the following generic prescription for finding a complex modulation space-time block code:
1. Find a N-dimensional representation of the Clifford algebra $\gamma_k\gamma_j+\gamma_j\gamma_k=-2\delta_{jk}I_N$, j, k=1, . . . , 2K−1 for anti-hermitean matrices $\gamma_k$, k=1, . . . , 2K−1.
2. Take an unitary matrix $\beta_0 \in U(N)$.
3. Define $\beta_k=\beta_0\gamma_k$, k=1, . . . , 2K−1.
4. Use the matrices $\delta_k$, k=0, . . . , 2K−1 to create a code matrix C(z) according to $$C = \sum_{k=1}^{K} (x_k\beta_{2k-2} + y_k\beta_{2k-1}).$$

By construction, this prescription yields all possible complex linear space-time codes with N antennas and time epochs, full diversity, and rate K/N. The codes with minimal dimensions for a given rate are thus delay optimal codes.

Similar to what was shown as a result of the Hurwitz-Radon proof, the representation theory of Clifford algebas give very stringent conditions on the existence of block codes with arbitrary rate K/N. For an orthogonal complex modulation space-time block code employing N antennas, the maximal achievable rate is:

$$\frac{[\log_2 N]+1}{2^{[\log_2 N]}} \quad (27)$$

However, one may not always need optimal codes. An embodiment of the invention provides a sub-optimal solution as will be presented below.

Representation Theory of Clifford Algebras

Let us look at an example using Clifford algebra representation. Suppose you have K objects that fulfill the defining relations of the generators of a Clifford algebra $\gamma_k\gamma_j+\gamma_j\gamma_k=-2\delta_{jk}I_N$, j, k=1, . . . , 2K−1. That is, fourth roots of the identity matrix, (i.e. $g \in G \ni g^2=-1$), and they anti-commute. We want to represent these objects as anti-hermitean square matrices, and we are interested in the minimal dimension of irreducible representations. (An irreducible representation is one that cannot be decomposed into a direct product of two lower-dimensional ones). For anti-hermitean matrices, idempotency translates to unitarity. The enveloping algebra of these objects is the algebra Clifford$_K$. We shall use this terminology loosely, and refer with "Clifford$_K$" to the algebra of the generators of Clifford$_K$.

In constructing representations for Clifford algebras, we shall use the following matrices:

$$\sigma_1 = \begin{pmatrix} 0 & 1 \\ -1 & 0 \end{pmatrix}, \sigma_2 = \begin{pmatrix} 0 & I \\ I & 0 \end{pmatrix}, \text{ and } \sigma_3 = \begin{pmatrix} 1 & 0 \\ 0 & -1 \end{pmatrix} \quad (28)$$

Matrices (28) are proportional to the Pauli matrices. For later convenience, these have been chosen so that $\sigma_1$ and $\sigma_2$ are anti-hermitean, and $\sigma_3$ is hermitean. The matrices that $\sigma_1$, $\sigma_2$, and I $\sigma_3$ constitute a basis for the algebra Su$_2$, the algebra of anti-hermitean 2×2 matrices with vanishing trace, which is a real form of Sl$_2$(C)=A1 in Cartan's classification of Lie algebras. The fundamental representation (the minimal dimension faithful representation), is generated by these 2×2 matrices.

Minimal Dimensions for Irreducible Representations

First consider the case K=2. Clearly, the objects $\gamma_1$, $\gamma_2$ cannot be represented as complex numbers. The minimal dimension to represent two anti-commuting objects is 2. It is easy to find two anti-commuting anti-hermitean unitary 2×2 matrices, take e.g.

$$\gamma_1=\sigma_1; \gamma_2=\sigma_2 \quad (29)$$

Now consider a Clifford-algebra generated by three elements $\gamma_1;\gamma_2;\gamma_3$. From the anti-commutation relations, it follows that the product $\gamma_1\gamma_2;\gamma_3$ commutes with all generators of the algebra. As an hermitean/Casimir operator, its matrix representation can be taken to be proportional to the unit matrix $I_2$. Thus, $\gamma_3$ can be represented in the same matrix dimension as $\gamma_1$ and $\gamma_2$, and is simply proportional to their product. Corresponding to $\gamma_1=\sigma_1; \gamma_2=\sigma_2$. we have e.g.

$$\gamma_3=\gamma_1\gamma_2=I\sigma_3. \quad (30)$$

Here we see that Clifford$_3$ coincides with the algebra su$_2$. Also, Clifford$_2$ is a two-dimensional sub-algebra of su$_2$.

Taking the matrices $\beta$ in $$C = \sum_{k=1}^{K} (x_k\beta_{2k-2} + y_k\beta_{2k-1}).$$

to be the above representation of the three generators of Clifford$_3$, together with the two-dimensional unit matrix, we get exactly the 2×2 Alamouti code. Next add a fourth generator to the Clifford-algebra. Denoting $\tilde{\gamma}_3=-j\gamma_1\gamma_2\gamma_3$, $\tilde{\gamma}_4=-j\gamma_1\gamma_2\gamma_4$, we see from the anti-commutation relations that the sub-algebras generated by $\gamma_1,\gamma_2$ and $\tilde{\gamma}_3,\tilde{\gamma}_4$ commute. The two sub-algebras, on the other hand, are isomorphic to Clifford$_2$. Thus each of these subalgebras can be represented using the matrices in Equation (A.27). The two commuting sub-algebras, however, have to be represented using the tensor product. Thus, we get the following matrix representation for the generators of Clifford$_4$:

$$\gamma_1=I_2\sigma_1; \gamma_2=I_2\sigma_2 \;\; \tilde{\gamma}_3=\sigma_1 I_2; \;\; \tilde{\gamma}_4=\sigma_2 I_2. \quad (31)$$

Adding a fifth generator, we again note that $j\gamma_1\gamma_2\gamma_3\gamma_4\gamma_5$ is an hermitean/Casimir operator, and its matrix representation can be taken proportional to the unit matrix. Thus, we can define e.g. $\gamma_5=-j\gamma_1\gamma_2\gamma_3\gamma_4$.

We have constructed the following representation of Clifford$_5$:

$$\gamma_1 = \begin{bmatrix} 0 & 1 & 0 & 0 \\ -1 & 0 & 0 & 0 \\ 0 & 0 & 0 & 1 \\ 0 & 0 & -1 & 0 \end{bmatrix}, \gamma_2 = \begin{bmatrix} 0 & j & 0 & 0 \\ j & 0 & 0 & 0 \\ 0 & 0 & 0 & j \\ 0 & 0 & j & 0 \end{bmatrix}, \quad (32)$$

$$\gamma_3 = \begin{bmatrix} 0 & 0 & 1 & 0 \\ 0 & 0 & 0 & -1 \\ -1 & 0 & 0 & 0 \\ 0 & 1 & 0 & 0 \end{bmatrix}, \gamma_4 = \begin{bmatrix} 0 & 0 & j & 0 \\ 0 & 0 & 0 & -j \\ j & 0 & 0 & 0 \\ 0 & -j & 0 & 0 \end{bmatrix},$$

$$\gamma_5 = \begin{bmatrix} j & 0 & 0 & 0 \\ 0 & -j & 0 & 0 \\ 0 & 0 & -j & 0 \\ 0 & 0 & 0 & j \end{bmatrix},$$

To get the form $$C_{3/4}(s_1, s_2, s_3) = \begin{bmatrix} s_1 & s_2 & s_3 & 0 \\ -s_2^* & s_1^* & 0 & -s_3 \\ -s_3^* & 0 & s_1^* & s_2 \\ 0 & s_3^* & -s_2^* & s_1 \end{bmatrix} \quad (33)$$

using prescription $$C = \sum_{k=1}^{K}(x_k \beta_{2k-2} + y_k \beta_{2k-1}).,$$

one can use the matrices above with the indices cyclically permuted.

The same construction can be applied to find inductively the irreducible representations of a Clifford algebra generated by an arbitrary number of elements K. There are two different sets of induction steps, from even K−1 to odd K, and from even K−2 to even K. For even K, the induction steps are the following:

$$\text{Define} \quad \tilde{\gamma}_K = (-j)^{K/2-1}\left(\prod_{i=1}^{K-2} \gamma_j\right)\gamma_K, \quad (34)$$

$$\tilde{\gamma}_{K-1} = (-j)^{K/2-1}\left(\prod_{i=1}^{K-2} \gamma_j\right)\gamma_{K-1}.$$

Note that $$\{\gamma_j\}_{j=1}^{K-2}$$

and $\{\tilde{\gamma}_{K-1}, \tilde{\gamma}_K\}$ generate commuting Clifford sub-algebras isomorphic to Clifford$_{K-2}$ and Clifford$_2$.

Use a tensor product of existing irreducible representations $R_{K-2}$ of Clifford$_{K-2}$ and $R_2$ of Clifford$_2$ to represent these sub-algebras:

$$R_K(\gamma_j) = I_2 R_{K-2}(\gamma_j), j=1, \ldots K-2$$

$$R_K(\tilde{\gamma}_{K-1}) = R_2(\gamma_1) I_{\dim R_{K-2}}$$

$$R_K(\tilde{\gamma}_K) = R_2(\gamma_2) I_{\dim R_{K-2}} \quad (35)$$

Finally, invert the definitions of the $\tilde{\gamma}$:s, $$R_K(\gamma_{\{K-1,K\}}) = j^{K/2-1} R_K\left(\prod_{j=1}^{K-2} \gamma_j \tilde{\gamma}_{\{K-1,K\}}\right) \quad (36)$$

The induction steps from even K−1 to odd K are following $$\text{Define } \Lambda_K = (-j)^{(K+1)/2} \prod_{j=1}^{K} \gamma_j \quad (37)$$

Note that $\Lambda_K$ is a Casimir operator; it commutes with all $\{\gamma_j\}_{j=1}^{K}$.

Represent it by the unit operator in the representation $R_{K-1}$.

Take $$R_K(\gamma_j) = R_{K-1}(\gamma_j), j = 1, \ldots K-1 \quad (38)$$

$$R_K(\gamma_K) = j^{(K+1)/2} R_{K-1}\left(\prod_{j=1}^{K-1} \gamma_j\right) \quad (39)$$

The induction steps above can be used to prove the following theorem: The minimal dimension to represent a Clifford algebra generated by K elements is $2^{[K/2]}$. The minimal representation matrices are elements in the space $$R_K^{minimal} = \underbrace{\tilde{R}_2(su_2) \otimes \tilde{R}_2(su_2) \otimes \ldots \otimes \tilde{R}_2(su_2)}_{[K/2]\text{elements}}. \quad (40)$$

Here, $R_2(su_2)$ is the fundamental two-dimensional representation of $su_2$, the algebra of anti-hermitean 2×2 matrices with vanishing trace. $\tilde{R}$ denotes this representation space enlarged by matrices proportional to the two-dimensional unit matrix.

A minimal (i.e. $2^{K-1}$) dimensional representation of Clifford$_K$ constructed by the induction described above, is $$\gamma_2 = \underbrace{I_2 \otimes I_2 \otimes \ldots \otimes I_2 \otimes I_2}_{K-2\,\text{times}} \otimes \sigma_1 \quad (41)$$

$$\gamma_3 = \underbrace{I_2 \otimes I_2 \otimes \ldots \otimes I_2 \otimes I_2}_{K-3\,\text{times}} \otimes \sigma_2$$

$$\gamma_4 = \underbrace{I_2 \otimes I_2 \otimes \ldots \otimes I_2 \otimes I_2}_{K-3\,\text{times}} \otimes \sigma_1 \otimes \sigma_3$$

$$\gamma_5 = \underbrace{I_2 \otimes I_2 \otimes \ldots \otimes I_2 \otimes I_2}_{K-3\,\text{times}} \otimes \sigma_2 \otimes \sigma_3$$

$$\gamma_6 = \underbrace{I_2 \otimes \ldots \otimes I_2}_{K-4\,\text{times}} \otimes \sigma_1 \otimes \sigma_3 \otimes \sigma_3$$

$$\gamma_7 = \underbrace{I_2 \otimes \ldots \otimes I_2}_{K-4\,\text{times}} \otimes \sigma_2 \otimes \sigma_3 \otimes \sigma_3$$

$$\vdots$$

$$\gamma_{2k} = \underbrace{I_2 \otimes \ldots \otimes I_2}_{K-1-k\,\text{times}} \otimes \sigma_1 \otimes \underbrace{\sigma_3 \otimes \ldots \otimes \sigma_3}_{k-1\,\text{times}}$$

$$\gamma_{2k+1} = \underbrace{I_2 \otimes \ldots \otimes I_2}_{K-1-k\,\text{times}} \otimes \sigma_2 \otimes \underbrace{\sigma_3 \otimes \ldots \otimes \sigma_3}_{k-1\,\text{times}}$$

$$\vdots$$

$$\gamma_{2K-2} = \sigma_1 \otimes \underbrace{\sigma_3 \otimes \ldots \otimes \sigma_3}_{K-2\,\text{times}}$$

-continued $$\gamma_{2K-1} = \sigma_2 \otimes \underbrace{\sigma_3 \otimes \ldots \otimes \sigma_3}_{K-2 \text{ times}}$$

$$\gamma_1 = j\underbrace{\sigma_3 \otimes \sigma_3 \otimes \ldots \otimes \sigma_3}_{K-1 \text{ times}}$$

To classify all possible representations, one has to assess the free parameters in this construction.

First, note that the anti-commutation relations $\gamma_k\gamma_j + \gamma_j\gamma_k = -2\delta_{jk}I_N$, j, k=1, . . . , 2K−1 have the symmetry $$\gamma_j \rightarrow V^H \gamma_j V, \, j=1, \ldots, L \quad (42)$$

where V is an unitary $\dim R_K \times \dim R_K$ matrix. This symmetry is large enough to accommodate any choice of basis in Clifford$_2$ sub-algebras.

Second, it is easy to see that representation in higher than the minimal dimensions can be found by taking any three higher dimensional anti-commuting matrices instead of $\sigma_1$, $\sigma_2$, and $\sigma_3$ as a basis in any of the elements in the tensor-product above. Anti-commuting fourth roots of the identity matrix, however, are hard to come by.

A generic representation space would thus be $$R_K^{(d_1, \ldots, d_{[K/2]})} = \quad (43)$$
$$\left( \oplus_{k=1}^{d_1/2} \tilde{R}_2(su_2) \right) \otimes \left( \oplus_{k=1}^{d_2/2} \tilde{R}_2(su_2) \right) \otimes \ldots \otimes \left( \oplus_{k=1}^{d_{[K/2]}/2} \tilde{R}_2(su_2) \right)$$

where the dimensions of the commuting sub-algebra representation $(d_1, \ldots, d_{[K/2]})$ are even integers $\geq 2$.

The above can be placed in a less rigorous mathematical narrative. By multiplying by a unitary N×N matrix, a square space-time block code which is freely selected from the left can be brought to a form in which the real part of a symbol to be transmitted appears only on the diagonal of the code matrix. If the symbols to be transmitted are interpreted in the above manner, said real part appears in every diagonal element, multiplied by the same real number. In this case, the dependence of the code matrix on the real part of the symbol is proportional to an N-dimensional unit matrix.

Let us next examine a method in which a unitary N×N matrix is formed, the elements of which depend linearly on symbols $s_k$, the unitarity coefficient of which is proportional to the sum of the absolute value squares of the symbols $s_k$ and the dependence of which on the real part of a symbol $s_l$ is proportional to an N-dimensional unit matrix.

Let us take a freely selected 2K−1 quantity of N×N matrices, which are all antihermitean and unitary and which all anti-commute with each other. An anti-hermitean matrix refers to a matrix, the hermitean conjugate of which is the matrix itself multiplied by −1. Anti-commutation means that when two matrices can be multiplied by each other in two orders, then if one product is −1 times the other product, the matrices anti-commute. The above family, to which 2K−1 matrices belong, can be called an N-dimensional anti-commutator algebra presentation of 2K−1 elements.

Let us form K−1 pairs of these 2K−1 matrices. Since there is an uneven number of matrices, an N-dimensional unit matrix is used to form a pair with the remaining matrix. Two matrices are formed of each matrix pair such that the second matrix of the pair, multiplied by the imaginary unit, is added to and subtracted from the first matrix of the pair. The unit matrix is interpreted in its own pair as the first matrix. This way, 2K matrices are formed. These matrices form a complexified anti-commutator algebra extended by a unit element. In short they are called complex anti-commutator matrices.

A code matrix is formed such that each of the matrices formed as above defines the dependence of the code matrix on one and only one $s_k$ or the complex conjugate of $s_k$. Thus, the code matrix is the sum of 2K elements and each element is the product of some $s_k$ or $s_k$ complex conjugate and an N×N complex anti-commutator matrix, such that each symbol, complex conjugate, and matrix only appears once in the expression.

Let us examine a method of forming an N-dimensional anti-commutator algebra presentation of 2K−1 elements.

First, three 2×2 matrices are freely selected, the matrices fulfilling the following conditions:

matrices are anti-hermitean and unitary; and
matrices anti-commute with each other.

So, the matrices form an anti-commutator algebra presentation of the freely selected 3 elements. Two matrices are selected from the above defined matrices, and they can be called an elementary pair. The remaining matrix is multiplied by the imaginary unit, and the result is called a third elementary matrix. In addition, a matrix proportional to a two-dimensional unit matrix is used as a fourth elementary matrix. This matrix can be called an elementary unit matrix.

K−1 pairs of N×N matrices are formed of these matrices by formulating tensor products of K−1 elementary matrices for example in the following manner:

The first matrix pair is established as a tensor product of K−2 elementary unit matrices and members of the elementary pair. Each member of the elementary pair appears as separately tensored with the unit matrices. This gives two matrices, (i.e. a matrix pair).

The second matrix pair is obtained by tensoring K−3 elementary matrices, one member of the elementary pair and the third elementary matrix, in this order.

The lth matrix pair is obtained by tensoring K-l−1 elementary unit matrices, one member of the elementary pair and l−1 third elementary matrices, in this order.

K−1th pair is obtained by tensoring one member of the elementary pair and K−2 third elementary matrices.

The tensor product of two matrices can be understood as a block form by considering a matrix with as many blocks as the first matrix to be tensored has elements, each block being as big as the second matrix to be tensored. A block of the tensor product is the corresponding element of the first matrix times the second matrix.

In the above manner we arrive at 2K−2 N-dimensional complex anti-commutator matrices, where $N=2^{K-1}$. The 2K−1th anti-commutator matrix is obtained by tensoring K−1 third elementary matrices and by multiplying by the imaginary unit.

Let us next examine an example of the above method. The following anti-hermitean unitary 2×2 matrices anti-commuting with each other are selected:

$$\sigma_1 = \begin{pmatrix} 0 & 1 \\ -1 & 0 \end{pmatrix}; \quad \sigma_2 = \begin{pmatrix} 0 & i \\ i & 0 \end{pmatrix}; \quad \tau = \begin{pmatrix} -i & 0 \\ 0 & i \end{pmatrix}. \quad (44)$$

Here the imaginary unit is marked with the letter i. Let us call the pair $\sigma_1$, $\sigma_2$ an elementary pair and the matrix $\sigma_3 = i\tau$ as a third elementary matrix. As a fourth elementary matrix, a 2-dimensional unit matrix $$1_2 = \begin{pmatrix} 1 & 0 \\ 0 & 1 \end{pmatrix} \qquad (45)$$

is used, which is called an elementary unit matrix.

$N=2^{K-1}$-dimensional complex anti-commutator matrices are formed as tensor products of the elementary matrices:

$$\gamma_2 = \underbrace{1_2 \otimes 1_2 \otimes 1_2 \otimes \ldots \otimes 1_2}_{K-2 \text{ times}} \otimes \sigma_1 \qquad (46)$$

$$\gamma_3 = \underbrace{1_2 \otimes 1_2 \otimes 1_2 \otimes \ldots \otimes 1_2}_{K-2 \text{ times}} \otimes \sigma_2$$

$$\gamma_4 = \underbrace{1_2 \otimes 1_2 \otimes 1_2 \otimes \ldots \otimes 1_2}_{K-3 \text{ times}} \otimes \sigma_1 \otimes \sigma_3$$

$$\gamma_5 = \underbrace{1_2 \otimes 1_2 \otimes 1_2 \otimes \ldots \otimes 1_2}_{K-3 \text{ times}} \otimes \sigma_2 \otimes \sigma_3$$

$$\gamma_6 = \underbrace{1_2 \otimes 1_2 \otimes 1_2 \otimes \ldots \otimes 1_2}_{K-4 \text{ times}} \otimes \sigma_1 \otimes \sigma_3 \otimes \sigma_3$$

$$\gamma_7 = \underbrace{1_2 \otimes 1_2 \otimes 1_2 \otimes \ldots \otimes 1_2}_{K-4 \text{ times}} \otimes \sigma_2 \otimes \sigma_3 \otimes \sigma_3$$

$$\gamma_{2K} = \underbrace{1_2 \otimes 1_2 \otimes 1_2 \otimes \ldots \otimes 1_2}_{K-1-k \text{ times}} \otimes \sigma_1 \underbrace{\otimes \sigma_3 \otimes \ldots \otimes \sigma_3}_{k-1 \text{ times}}$$

$$\gamma_{2K+1} = \underbrace{1_2 \otimes 1_2 \otimes 1_2 \otimes \ldots \otimes 1_2}_{K-1-k \text{ times}} \otimes \sigma_2 \underbrace{\otimes \sigma_3 \otimes \ldots \otimes \sigma_3}_{k-1 \text{ times}}$$

$$\gamma_{2K-2} = \sigma_1 \underbrace{\otimes \sigma_3 \otimes \ldots \otimes \sigma_3}_{K-2 \text{ times}}$$

$$\gamma_{2K-1} = \sigma_2 \underbrace{\otimes \sigma_3 \otimes \ldots \otimes \sigma_3}_{K-2 \text{ times}}$$

$$\gamma_1 = I\sigma_3 \underbrace{\otimes \sigma_3 \otimes \ldots \otimes \sigma_3}_{K-1 \text{ times}}$$

The formed matrices are an example of a $2K-1$ quantity of $N=2^{K-1}$-dimensional antihermitean unitary matrices anti-commuting with each other.

From these matrices, $2K$ complex anticommutator matrices $\{\gamma_{k+}, \gamma_{k-}\}_{k=1}^{K}$ are formed in the following way:

$$\gamma_{k\pm} = \frac{(\gamma_{2k-2} \pm i\gamma_{2k-1})}{2}, k = 1, \ldots, K. \qquad (47)$$

Matrices $\gamma_k$ defined above are used herein. In addition, the $2^{K-1}$-dimensional unit matrix is marked with $\gamma_0$. The matrices have also been normalized by dividing by two. The code matrix can now be formed for example as follows:

$$C = \sum_{k=1}^{K} (s_k \gamma_{k-} + s_k^* \gamma_{k+}) \qquad (48)$$

The obtained code is a delay optimal basic block code. All possible basic block codes of a given code rate can be created simply by interchanging the places of rows and/or columns in all $\gamma$ matrices simultaneously, or by multiplying the $\gamma$ matrices by any combination of terms, or changing the numbering of the $\gamma$ matrices, or by multiplying all $\gamma$ matrices from right and/or left by a unitary matrix which has four elements diverging from zero, the elements being an arbitrary combination of the numbers $\pm 1, \pm i$.

For example, the basic rate 3/4 code for four transmit antennas as formed in the above manner has the form $$(s_1, s_2, s_3) \rightarrow \begin{pmatrix} s_1 & s_2 & s_3 & 0 \\ -s_2^* & s_1^* & 0 & -s_3 \\ -s_3^* & 0 & s_1^* & s_2 \\ 0 & s_3^* & -s_2^* & s_1 \end{pmatrix} \qquad (49)$$

Here $N=4$ and $K=3$. Further, the rate 1/2 code for eight antennas, for example, is $$(s_1, s_2, s_3) \rightarrow \begin{pmatrix} s_1 & s_2 & s_3 & 0 & s_4 & 0 & 0 & 0 \\ -s_2^* & s_1^* & 0 & -s_3 & 0 & -s_4 & 0 & 0 \\ -s_3^* & 0 & s_1^* & s_2 & 0 & 0 & -s_4 & 0 \\ 0 & s_3^* & -s_2^* & s_1 & 0 & 0 & 0 & s_4 \\ -s_4^* & 0 & 0 & 0 & s_1^* & s_2 & s_3 & 0 \\ 0 & s_4^* & 0 & 0 & -s_2^* & s_1 & 0 & -s_3 \\ 0 & 0 & s_4^* & 0 & -s_3^* & 0 & s_1 & s_2 \\ 0 & 0 & 0 & -s_4^* & 0 & s_3^* & -s_2^* & s_1^* \end{pmatrix} \qquad (50)$$

Here the rate 3/4 code is in the upper left corner and the corresponding inverted complex conjugate in the lower right corner.

By the above manner, 'basic codes' are obtained, in which the elements only depend on one signal, or the real part of one signal and the imaginary part of another. The combination of any $N'<N$ code matrix columns give a full diversity non-square code for $N'$ antennas. Using these codes, full diversity codes, which do not have the above restriction, can be constructed in the solution of the invention. In a solution according to a preferred embodiment of the invention the elements are allowed to be linear combinations. This way, provided that full diversity is provided, block codes that are unitarily converted are obtained, having the form $$\overline{C} = UC(s)V, \qquad (51)$$

where $C(s)$ is a basic block code, such as above. It is an $N \times N'$ matrix, where $N$ is the number of time slots and $N'$ is the number of antennas. U and V are $N \times N$ and $N' \times N'$ unitary matrices. The phase shifts caused by U and V are irrelevant. U and V can be assumed to be unitary matrices with determinant 1.

This construction gives a family of block codes with $N^2 + N'^2 - 2$ continuous parameters. The square codes obtained this way comprise delay optimal maximal rate block codes when the number of antennas is proportional to a power of two.

Consider, for example, the rate 3/4 code for four antennas which were described above (49). A generic unitary 4×4 matrix with a unit determinant can be written, for example, as $$V = \exp\frac{i}{2}\begin{pmatrix} \Phi_{13} + \frac{1}{\sqrt{3}}\Phi_{14} + \frac{1}{\sqrt{6}}\Phi_{15} & w_1 & w_2 & w_3 \\ w_1^* & -\Phi_{13} + \frac{1}{\sqrt{3}}\Phi_{14} + \frac{1}{\sqrt{6}}\Phi_{15} & w_4 & w_5 \\ w_2^* & w_4^* & \frac{-2}{\sqrt{3}}\Phi_{14} + \frac{1}{\sqrt{6}}\Phi_{15} & w_6 \\ w_3^* & w_5^* & w_6^* & \frac{-3}{\sqrt{6}}\Phi_{15} \end{pmatrix} \quad (52)$$

where the exp operation is a matrix exponential, the six parameters $\omega_k$ are complex and the three parameters $\Phi_k$ are real. U is of the same form. All in all this makes 30 free real parameters. All possible generalizations of said 3/4 code (49) can now be constructed by applying the transformation (51) and using the above described U and V.

It would be desirable that transmission power is distributed equally between different antennas. However, when for example the prior art 3/4 code (the 3/4 code mentioned in the introduction of the application, for instance) is used, some antennas transmit using only half of their power at certain times. If the code (49) according to a preferred embodiment of the invention is used, the ratio of the peak power to the average power can be made lower. In addition, this construction allows that instead of transmitting zeros of the code matrix, a signal that is orthogonalized in some other way (for example by a different spreading code), a pilot signal for instance, may be transmitted. This way a fully power-uniformized transmission can be provided.

In a system with several users, especially in a code division and frequency division system, users may be provided with different versions (for example, a version with a permutated antenna order) of the block code, and thus the transmission powers can be uniformized.

Sometimes, in a time division system with several users, for example, it is preferable to balance the transmission of one user directly without using the above mentioned ways. In a solution according to a preferred embodiment of the invention, an unequal distribution of transmission power between different antennas may be avoided and the above described unitary transformation (51) is applied. The power spectrum of different antennas cannot necessarily be uniformized in respect to each other as a function of time, but by selecting the unitary transformation preferable, the average transmission powers of the antennas are uniformized and the ratio of the peak power to the average power and the ratio of the minimum power to the average power can be minimized.

Let us examine this embodiment by means of an example. Consider the above described 3/4 code (49) for four antennas. Depending on which parameter needs to be improved, the matrices U and V are selected in an appropriate manner. If the minimum-to-average power needs to be optimized, V is selected as the unit matrix and U as the 4×4 Hadamard matrix:

$$U = 1/2 \begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad (53)$$

Now by applying the transformation (51) to the code (49) with the above mentioned matrices U and V, the power-uniformized code is $$\overline{C} = UC(z) \quad (54)$$

$$= \begin{pmatrix} s_1 - s_2^* - s_3^* & s_1^* + s_2^* + s_3 & s_1^* - s_2^* + s_3 & s_1 + s_2 - s_3 \\ s_1 + s_2^* - s_3^* & -s_1^* + s_2^* - s_3 & s_1^* + s_2^* + s_3 & -s_1 + s_2 + s_3 \\ s_1 - s_2^* + s_3^* & s_1^* + s_2^* - s_3 & -s_1^* + s_2^* + s_3 & -s_1 - s_2 - s_3 \\ s_1 + s_2^* + s_3^* & -s_1^* + s_2^* + s_3 & -s_1^* - s_2^* + s_3 & s_1 - s_2 + s_3 \end{pmatrix}.$$

On the other hand, if the peak-to-average power needs to be minimized, U and V can be selected for example as follows: (It is assumed herein that the signal constellation is 8-PSK.)

$$U = 1/2 \begin{pmatrix} 1 & e^{-i\frac{\pi}{8}} & e^{-i\frac{\pi}{4}} & e^{-i\frac{3\pi}{8}} \\ 1 & -e^{-i\frac{\pi}{8}} & e^{-i\frac{\pi}{4}} & -e^{-i\frac{3\pi}{8}} \\ 1 & e^{-i\frac{\pi}{8}} & -e^{-i\frac{\pi}{4}} & -e^{-i\frac{3\pi}{8}} \\ 1 & -e^{-i\frac{\pi}{8}} & -e^{-i\frac{\pi}{4}} & e^{-i\frac{3\pi}{8}} \end{pmatrix} \text{ and} \quad (55)$$

$$V = \begin{pmatrix} 1 & 0 & 0 & 0 \\ 0 & e^{i\frac{\pi}{8}} & 0 & 0 \\ 0 & 0 & e^{-i\frac{\pi}{4}} & 0 \\ 0 & 0 & 0 & e^{i\frac{3\pi}{8}} \end{pmatrix} \quad (56)$$

Applying now the transformation (51) to the code (49) with the above matrices U and V, a power-uniformized code is achieved, which has a minimal peak-to-average power $$\overline{C} = UC(s)V = \qquad (57)$$

$$\frac{1}{2}\begin{pmatrix} z_1 - e^{-i\frac{\pi}{8}}z_2^* - e^{-i\frac{\pi}{4}}z_3^* & z_1^* + e^{i\frac{\pi}{8}}z_2 + e^{-i\frac{\pi}{4}}z_3^* & z_1^* - e^{-i\frac{\pi}{8}}z_2^* + e^{i\frac{\pi}{4}}z_3 & z_1 + e^{i\frac{\pi}{8}}z_2 - e^{i\frac{\pi}{4}}z_3 \\ z_1 + e^{-i\frac{\pi}{8}}z_2^* - e^{-i\frac{\pi}{4}}z_3^* & -z_1^* + e^{i\frac{\pi}{8}}z_2 - e^{-i\frac{\pi}{4}}z_3^* & z_1^* + e^{-i\frac{\pi}{8}}z_2^* + e^{i\frac{\pi}{4}}z_3 & -z_1 + e^{i\frac{\pi}{8}}z_2 + e^{i\frac{\pi}{4}}z_3 \\ z_1 - e^{-i\frac{\pi}{8}}z_2^* + e^{-i\frac{\pi}{4}}z_3^* & z_1^* + e^{i\frac{\pi}{8}}z_2 - e^{-i\frac{\pi}{4}}z_3^* & -z_1^* + e^{-i\frac{\pi}{8}}z_2^* + e^{i\frac{\pi}{4}}z_3 & -z_1 - e^{i\frac{\pi}{8}}z_2 - e^{i\frac{\pi}{4}}z_3 \\ z_1 + e^{-i\frac{\pi}{8}}z_2^* + e^{-i\frac{\pi}{4}}z_3^* & -z_1^* + e^{i\frac{\pi}{8}}z_2 + e^{-i\frac{\pi}{4}}z_3^* & -z_1^* - e^{-i\frac{\pi}{8}}z_2^* + e^{i\frac{\pi}{4}}z_3 & z_1 - e^{i\frac{\pi}{8}}z_2 + e^{i\frac{\pi}{4}}z_3 \end{pmatrix}.$$

Let us next examine a decoding method which can be applied to the reception of the signals that are coded in the above manners. Let us assume that a receiver has M antennas. Let us further assume that N' antennas are used for transmission in a transmitter and that the block code uses N time slots. The channel between the nth transmit antenna and the mth receive antenna is denoted by the term $\alpha_{nm}$. The channels can be assumed to be static over the frame N. The channel terms are collected into the N'×M matrix $$\alpha = \begin{pmatrix} \alpha_{11} & \alpha_{12} & \cdots & \alpha_{1M} \\ \alpha_{21} & \alpha_{22} & \cdots & \alpha_{2M} \\ \vdots & \vdots & \ddots & \vdots \\ \alpha_{N1} & \alpha_{N2} & \cdots & \alpha_{NM} \end{pmatrix} \qquad (58)$$

Correspondingly, the signal received by the antenna m at the time slot t is denoted by $r_{tm}$. The N×M matrix of these signals is obtained from the formula $$R = \overline{C}(s)\alpha + n, \qquad (59)$$

where n is an N×M matrix of additive complex Gaussian noise. The block code $\overline{C}$ is constructed as above ((1), (2) and (4)), possibly by restricting the number of antennas. Now denote $$\overline{\gamma}_{k\pm} = U_{\gamma_{k\pm}} V, \ k=1, \ldots, K \qquad (60)$$

Using these markings, the maximum likelihood detection metric for the kth transmitted symbol $s_k$ is $$M_k = |Tr(\overline{\gamma}_{k+}\alpha R^H + R\alpha^H \overline{\gamma}_{k-}^H) - s_k|^2 + (Tr(\alpha\alpha^H) - 1)|s_k|^2 \qquad (61)$$

where Tr refers to a matrix trace, (i.e. the sum of diagonal elements, and H refers to the complex conjugate transpose). Thus, the aim is to minimize the metric, (i.e. it is used as a criterion for deciding which symbol $s_k$ comprises).

Figure 3:
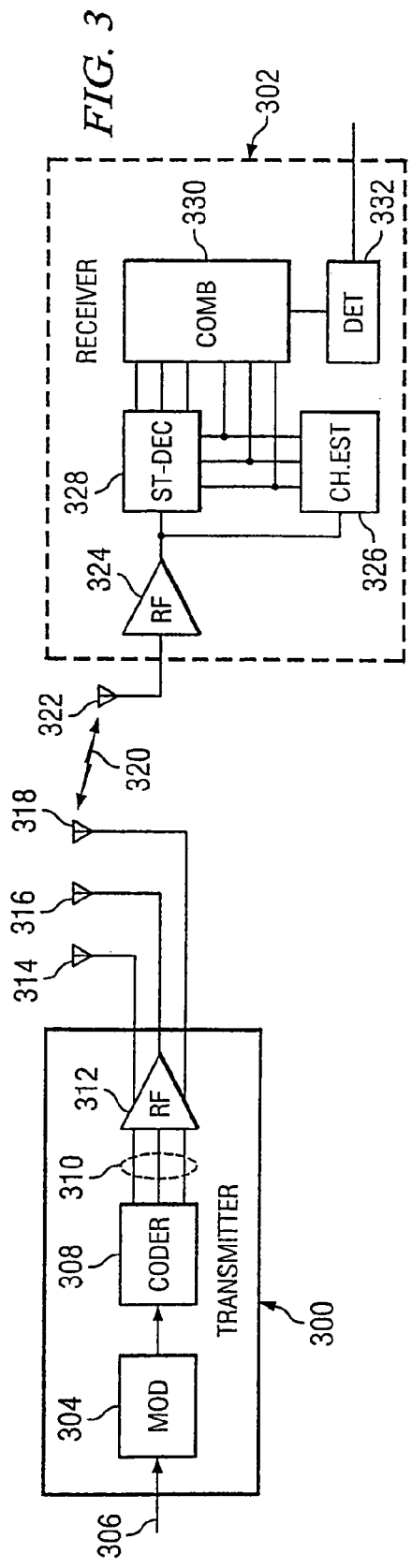
FIG. 3 is an illustration showing an example of a transmitter/receiver arrangement in accordance with an embodiment of the invention.

FIG. 3 is an illustration of an arrangement according to an embodiment of the invention—to be use as exemplar only. The figure shows a situation where channel-coded symbols are transmitted via three antennas at different frequencies, at different time slots or by using a different spreading code. Firstly, the figure shows a transmitter 300, which is in connection with a receiver 302. The transmitter comprises a modulator 304 which receives as input a signal 306 to be transmitted, which consists of bits in a solution according to a preferred embodiment of the invention. The bits are modulated to symbols in the modulator. The symbols to be transmitted are grouped into blocks having the length of a given K. It is assumed in this example that the length of the block is three symbols and that the symbols are $s_1$, $s_2$ and $s_3$. The symbols are conveyed to a coder 308. In the coder each block is coded to N×N' channel symbols. The channel symbols 310 are conveyed in this example via radio frequency parts 312 to three antennas 314 to 318 from where they are to be transmitted.

In the present example, the block comprises the symbols $s_1$, $s_2$ and $s_3$. The coder performs coding, the defining code matrix of which is formed of 2K elements, in which each element is a product of a symbol or symbol complex conjugate to be transmitted and a complex N×N anticommutator matrix, and in which each matrix is used at most once in the formation of the code matrix.

A code matrix can for example be the matrix (54) described above, which means that the coder performs the coding $$(s_1, s_2, s_3) \rightarrow \qquad (62)$$

$$\begin{pmatrix} s_1 - s_2^* - s_3^* & s_1^* + s_2^* + s_3^* & s_1^* - s_2^* + s_3^* & s_1 + s_2 - s_3 \\ s_1 + s_2^* - s_3^* & -s_1^* + s_2^* - s_3^* & s_1^* + s_2^* + s_3^* & -s_1 + s_2 + s_3 \\ s_1 - s_2^* + s_3^* & s_1^* + s_2^* - s_3^* & -s_1^* + s_2^* + s_3^* & -s_1 - s_2 - s_3 \\ s_1 + s_2^* + s_3^* & -s_1^* + s_2^* + s_3^* & -s_1^* - s_2^* + s_3^* & s_1 - s_2 + s_3 \end{pmatrix}.$$

The coder can preferably be implemented by means of a processor and suitable software or alternatively by means of separate components.

Let us examine the receiver shown in FIG. 3 once more. By means of the transmitter of the invention, a signal 320 is transmitted by using three or more antennas. The signal is received in the receiver 302 by means of an antenna 322 and it is conveyed to the radio frequency parts 324. In the radio frequency parts the signal is converted to an intermediate frequency or to baseband. The converted signal is conveyed to a channel estimator 326, which forms estimates for the channel through which the signal has propagated. The estimates can be formed, for example, by means of previously known bits the signal contains, such as a pilot signal or a training sequence code. The signal is conveyed from the radio frequency parts also to a combiner 328, to which also the estimates are delivered from the channel estimator 326. The channel estimator and the radio frequency parts can be implemented by employing the known methods.

The combiner 328 receives the symbols transmitted at different time slots, typically stores them temporarily in a buffer memory and forms estimates $\hat{s}_i$, i=1,2,3 for the original block symbols by means of the channel estimates and the metric (61). A detector 330 performs the symbol detection according to the formula (61). The signal is conveyed from the detector 330 to a channel decoder 332 and further to the other parts of the receiver. The detector can preferably be implemented by means of a processor and suitable software or alternatively by means of separate components.

Only one example of a possible receiver is described above. The calculation and use of channel estimates, for example, can be implemented in various other ways, as is obvious to a person skilled in the art.

For real signal constellations, full rate codes exist for up to 8 transmit antennas.

$$C_{3/4}(s_1, s_2, s_3) = \begin{bmatrix} s_1 & s_2 & s_3 & 0 \\ -s_2^* & s_1^* & 0 & -s_3 \\ -s_3^* & 0 & s_1^* & s_2 \\ 0 & s_3^* & -s_2^* & s_1 \end{bmatrix} \quad (63)$$

The 4-branch MRC linear decoding property of this code is reflected in the unitarity of the code matrix:

$$C_{3/4}^H C_{3/4} = (s_1 s_1^* + s_2 s_2^* + s_3 s_3^*) I \quad (64)$$

Some features of space-time block codes may be relaxed. One such feature is the requirement of orthogonality of the space-time block code. Here it is easy to see that rates less than 1 result in power-unbalanced schemes (i.e. the transmit power of a given antenna fluctuates in time). The basic rate 3/4 code is given above, the symbols transmitted are $s_1$, $s_2$, and $s_3$. A three antenna version of the code is derived by switching off one of the antennas. The inefficiency and power-unbalance is visible in the zeros of the code. Furthermore, it is clear from the code that the inefficiency of the code is due to the existence of redundant directions in the code matrix, which are not used for signaling. In the above code, this redundant direction is spanned by the off-diagonal in the code matrix. This code may be used as the basis of the code provided by another embodiment of the invention a Layered Space-Time Block Code is identified below. Layered space-time block codes involves patching pieces of fully orthogonal space-time block codes together.

Again, the symbol-wise maximum likelihood detection metric for the space-time block code (63) is $$M_k = |Tr(\beta_{k+} \alpha R^H + R \alpha^H \beta_{k-}^H) - s_k|^2 + (Tr(\alpha^H \alpha) - 1)|z_k|^2 \quad (65)$$

Here, $\alpha$ is the matrix of channel weights (allowing for a multitude of receive antennas), R is the matrix of received symbols, and the decoding matrices are $$\beta_{1-} = \begin{pmatrix} 1 & 0 & 0 & 0 \\ 0 & 0 & 0 & 0 \\ 0 & 0 & 0 & 0 \\ 0 & 0 & 0 & 1 \end{pmatrix} \quad \beta_{2-} = \begin{pmatrix} 0 & 1 & 0 & 0 \\ 0 & 0 & 0 & 0 \\ 0 & 0 & 0 & 1 \\ 0 & 0 & 0 & 0 \end{pmatrix} \quad (66)$$

$$\beta_{3-} = \begin{pmatrix} 0 & 0 & 1 & 0 \\ 0 & 0 & 0 & -1 \\ 0 & 0 & 0 & 0 \\ 0 & 0 & 0 & 0 \end{pmatrix}$$

$$\beta_{1+} = \begin{pmatrix} 0 & 0 & 0 & 0 \\ 0 & 1 & 0 & 0 \\ 0 & 0 & 1 & 0 \\ 0 & 0 & 0 & 0 \end{pmatrix} \quad \beta_{2+} = \begin{pmatrix} 0 & 0 & 0 & 0 \\ -1 & 0 & 0 & 0 \\ 0 & 0 & 0 & 0 \\ 0 & 0 & -1 & 0 \end{pmatrix}$$

$$\beta_{3+} = \begin{pmatrix} 0 & 0 & 0 & 0 \\ 0 & 0 & 0 & 0 \\ -1 & 0 & 0 & 0 \\ 0 & 1 & 0 & 0 \end{pmatrix}$$

For a space-time block code with rate less than one, the inefficiency of the code is exploited to transmit additional data. For example, parts of another block code (the higher layer code) may be appended onto the redundant directions of the block code. This is repeated as many time as is required to transmit the full higher layer code.

The upper layers violate the inherent orthogonality of the underlying block code, making linear one-step decoding impossible. However, the two-layer code can be decoded in two linear steps, first the upper layer, then, after interference cancellation, the component codes of the lower layer one at a time. Better performance is achieved, if instead of linear decoding, the upper layer is decoded by a optimal configuration search.

Similarly, the possible residual inefficiency of the two-layer code can be used to transmit a third layer block code. The linear decoding of a I-layer code has to be done in I steps, starting from the uppermost layer. The interference induced by a higher layer on the lower ones is cancelled after detection of the higher layer. The best performance is achieved when the upper layers are decoded by a optimal configuration search.

More mathematically, the basis of the proposed scheme is the following. Consider a space-time block code with N transmit antennas, and for simplicity, N symbol intervals. Code matrix orthogonality restricts the number of symbols to some number $K \leq N$. The proposed scheme applies when $K < N$. In this case, the antenna resource is used inefficiently, the block code has rate <1, and it is power-unbalanced.

The received symbol vector is a vector in N-dimensional complex space, call it the reception space. Now one should distinguish between two different kinds of orthogonality. First, there is the orthogonality of the code matrix, which translates on reception to linear decodability of the block code, and full diversity. Second, there is conventional orthogonality in the reception space.

The code-matrix-orthogonal K symbols span a K-dimensional subspace of the reception space, call it the block-code reception subspace. As $K < N$, there is room in the reception space for more information. This extra information is called the higher layer, and it is encoded into redundant directions of the code matrix, (i.e. code matrix directions that project onto directions of the reception space that are reception-space-orthogonal to the block-code reception subspace).

This reception-space-orthogonality does not translate into code-matrix orthogonality, as the latter was already maximized when maximizing K. Thus one-step linear decoding is lost. However, the redundant directions can be decoded first, and subtracted using interference cancellation. After this, what remains from the received symbols, can be linearly decoded using code-matrix orthogonality. Optimal decoding of the upper layer requires searching through the upper layer configurations to find the optimal one.

Straight forward use of the redundancy does not provide full diversity for the symbol(s) transmitted on the redundant direction. Rather, the channels combine uncoherently. To avoid this, one may use a higher layer block code, so that the outputs of the redundant directions of successive coding blocks yield the would-be received symbols of a block code. This higher-layer block code can then be decoded as a normal block code. After interference cancellation, one can decode the lower layer blocks.

Using a block code with rate <1 on the higher layer, leaves some residual inefficiency, (i.e. the rate of the layered code is still R<1). This inefficiency can again be used to accommodate information symbols for a even higher layer code. In this way, the code rate can be made asymptotically as close to unity as wished.

Alternatively, the additional layering can be terminated on any stage (also before adding any layers to the basic block code), and the remaining inefficiency can be used to transmit known pilot bits. These dedicated pilots would, apart from improving the channel estimates on reception, make the code completely power-balanced. Also, a rate-1 block code (Alamouti 2×2 or no code) can be used on an upper layer to make the layered code unit rate and power-balanced.

The upper layer codes can be designed so that it is possible to construct upper layer pseudo-received signals in which the interference from the lower layers is cancelled completely. These pseudo-received signals are constructed from the received signals and the powers of the estimated channels. The upper-layer code can thus be decoded directly, without considering lower-layer interference. The decoded upper layer can then be cancelled from the received signals, and the lower layer may be decoded linearly. This decoding scheme is sensitive to changes in the channels over the whole multi-layer block.

The upper-layer decoding based on pseudo-received symbols is sub-optimal, however. An optimal upper-layer decoding would involve searching the upper layer configuration which after IC and lower-layer decoding would give the smallest euclidean distance between the received signals and the explained part of the received signals. An optimal decoding is insensitive to changes in the channels between lowest layer sub-blocks.

The optimal decoding can be approached by iterating an IC-procedure. The transmitted symbols are divided into two parts, the lowest layer and the upper ones. The detected lowest and upper layer symbols are alternately subtracted from the received signals, using the residual signal to detect the upper and lowest layer symbols, respectively.

As the starting point of iterative IC detection, one may use the result of the multi-step linear decoding. Alternatively, one may start directly by decoding the lowest layer, with no upper layer IC.

The essential aspects of this embodiment of the invention are:

1. Using the redundant directions of a space-time block code matrix for signalling additional data.
2. Additional coding of the signals on the redundant direction.
3. More specifically, utilizing a higher layer block code for signaling on the redundant directions of successive lower layer transmit blocks, to improve the reliability of the higher layer bits.
4. If a redundant block-code is used for the higher layer, iterating the layering structure any number of times, always increasing the coding rate, asymptotically making it approach unity.
5. After terminating the layering procedure, possibly using the remaining redundancy to transmit pilot bits, thus making the code completely power-balanced.
6. Designing the code so that multi-step linear decoding is possible; with suitable operations, the interference from the lower layers to an upper ones can be completely cancelled. Thus one first decodes the highest layer block code, then cancels the interference from lower layer symbols, and repeats this until the lowest layer has been decoded. This decoding is sub-optimal, and sensitive to changes of the channels over the successive blocks covered by the layering scheme.
7. Iterative IC-decoding by alternatingly subtracting the interference caused by the upper layers on the lowest one and the lowest layer to the upper ones.
    The starting point of the first iteration of the lowest layer might be the upper-layer data produced by the multi-step linear decoding described above, if the channels do not change significantly over the whole signaling block.

If the channels do change significantly, or if the upper layer codes have not been designed to enable multi-layer linear decoding, the iterative IC-decoding should be started directly by decoding the lowest layer, skipping upper-layer IC.

Iterative IC decoding converges towards an optimal upper layers decoding by an upper-layers configuration search.

As examples, consider the embodiments built upon the four-antenna space-time block code $C_{3/4}$.

First we consider a version of the preferred embodiment, where the same 4×4 code $C_{3/4}$ is used on all layers. This results in a rate 15/16 2-layer code. A three antenna version of the code is created by turning of one of the antennas. This scheme keeps the diversity gain maximal by avoiding non-coherent combining loss in the upper layer.

In a two-layer code, the lowest layer of a two-layer code consists of four elementary blocks. Thus the processing delay is 16 symbol intervals. All in all, 15 complex symbols can be encoded into a two-layer block code with three or four transmit (Tx) antennas.

The redundant direction of a coding block of form (63) is spanned by the matrix $$\beta_0 = \begin{pmatrix} 0 & 0 & 0 & 1 \\ 0 & 0 & 1 & 0 \\ 0 & -1 & 0 & 0 \\ -1 & 0 & 0 & 0 \end{pmatrix} \quad (67)$$

This can be seen if $R=C(\bar{s})\alpha+\text{noise}$ to be the received symbol, when the conventional block code equation $C_{3/4}$ above is used for transmission, and $\alpha$ is the channel vector. The reception-space-orthogonality of the block-code reception subspace to the higher layer reception subspace is reflected in the fact that for this R, $$\alpha^T \beta_0 R = 0 + \text{noise}. \quad (68)$$

This equation is the basis of the layering embodiment of the invention.

To construct the second layer code, the zeros in the lower layer blocks are filled with rows from the higher layer block code. The higher layer matrix, inserted into the zeros, is constructed from the redundance spanner matrix $\beta_0$ and a code matrix of the form $C_{3/4}$, namely:

$$C^2 = \begin{bmatrix} s_{13} & s_{14} & s_{15} & 0 \\ -s_{14}^* & s_{13}^* & 0 & -s_{15} \\ -s_{15}^* & 0 & s_{13}^* & s_{14} \\ 0 & s_{15}^* & -s_{14}^* & s_{13} \end{bmatrix} \quad (69)$$

To each sub-block of the lower layer, a matrix is added that can be constructed as the product of the redundance spanner matrix $\beta_0$, and a matrix with one of the rows of $C^2$ on the diagonal. The resulting two-layer block code is shown in FIG. 5 and has a rate R=15/16.

Figures 1, 4:
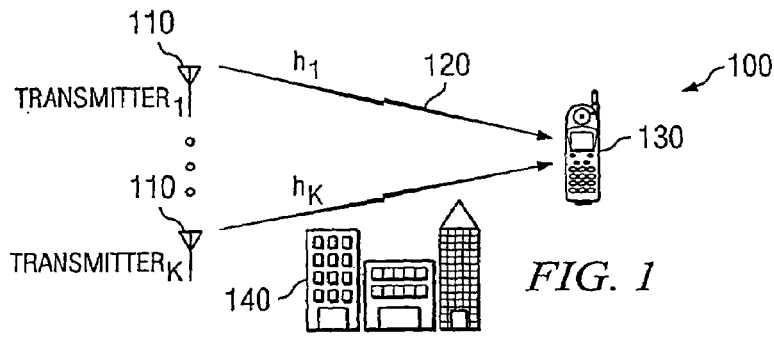
FIG. 1 shows an example of a system of multi-channel transmission in which multi-path fading may occur.
FIG. 4 shows a rate 15/16 two-layer block code for four antennas.

The zeros in the two-layer code in FIG. 4 may now be used to accommodate either pilot bits, or one row of a third layer block code. Repeating this four times, for each row of the Layer 3 block, we get a rate 63/64 three-layer block code for four transmit (Tx) antennas. This code provides full diversity, and encodes 63 complex symbols with a processing delay of 64. An example of a three-layer code is given in FIG. 5.

The procedure of inserting rows of the third layer code into holes of the two-layer codes, differs from inserting rows of the second layer to the one-layer codes, in that no sign changes indicated by multiplying with $\beta_0$ are required. This is a generic property—at even levels, some of the signs change with $\beta_0$, at odd levels, the code matrix rows are inserted as they are.

Repeating the pasting procedure, we get a rate 255/256 four-layer, four-antenna code with processing delay 256, a rate 1023/1024 five-layer, four-antenna code with processing delay 1024, and finally a rate $1-2^{-2l}$, four-antenna code with l layers and processing delay $2^{2l}$. Corresponding three-antenna codes can be created by deleting one of the antenna columns.

Finally, if desired, the residual inefficiency of these codes can be used to transmit pilot symbols. This would make the codes completely power-balanced.

Decoding

The decoding algorithms are presented for one receive (Rx) antenna. It is easy to generalize to any number of Rx antennas.

An optimal decoding involves an upper layer configuration search. Thus, for example for the 2-layer code of FIG. 4, optimal decoding would involve going through all $4^3=64$ combinations of upper layer symbols, canceling the hard bits from the lower layer received signals, decoding the lower layers using metric $$M_k = |Tr(\beta_{k+}\alpha R^H + R\alpha^H \beta_{k-}{}^H) - s_k|^2 + (Tr(\alpha^H\alpha) - 1)|s_k|^2 \quad (70)$$

and finding the configuration that minimizes the residual noise (the absolute difference of the received symbols and the part explained by the decided bits).

An optimal decoding is insensitive to changes of the channels between successive lowest layer blocks. The layered scheme thus is as sensitive to the fading speed as the lowest-layer block code.

This embodiment of the invention provides an iterative IC-procedure that converges towards optimal decoding for the 2-layer code in FIG. 4.

The complex channel weights between the n:th transmit and the receive antenna is denoted $\alpha_n$. The channel vector for 4-antenna transmission is thus $\alpha=(\alpha_1; \alpha_2; \alpha_3; \alpha_4)$. The 4×4 blocks of the two-layer code corresponding to the lower layer block codes are denoted $C(\vec{s})_{2\text{-}layer,m}$ m=1,2,3,4. Corresponding to these, the received symbols in the sixteen intervals covered by the code may be divided into four blocks of four:

$$_mR = C(\vec{s})_{2\text{-}layer,m} \alpha + \text{noise}, \, m=1,2,3,4. \quad (71)$$

To be explicit, the received symbols are $$_1R = \begin{bmatrix} \alpha_1 s_1 + \alpha_2 s_2 + \alpha_3 s_3 \\ \alpha_2 s_1^* - \alpha_1 s_2^* - \alpha_4 s_3 + \alpha_3 s_{15} \\ \alpha_3 s_1^* + \alpha_4 s_2^* - \alpha_1 s_3^* - \alpha_2 s_{14} \\ \alpha_4 s_1 - \alpha_3 s_2^* + \alpha_2 s_3^* - \alpha_1 s_{13} \end{bmatrix} + \text{noise} \quad (72)$$

$$_2R = \begin{bmatrix} \alpha_1 s_4 + \alpha_2 s_5 + \alpha_3 s_6 - \alpha_4 s_{15} \\ \alpha_2 s_4^* - \alpha_1 s_5^* - \alpha_4 s_6 \\ \alpha_3 s_4^* + \alpha_4 s_5 - \alpha_1 s_6^* - \alpha_2 s_{13}^* \\ \alpha_4 s_4 - \alpha_3 s_5^* + \alpha_2 s_6^* + \alpha_1 s_{14}^* \end{bmatrix} + \text{noise} \quad (73)$$

-continued $$_3R = \begin{bmatrix} \alpha_1 s_7 + \alpha_2 s_8 + \alpha_3 s_9 + \alpha_4 s_{14} \\ \alpha_2 s_7^* - \alpha_1 s_8^* - \alpha_4 s_9 + \alpha_3 s_{13}^* \\ \alpha_3 s_7^* + \alpha_4 s_8 - \alpha_1 s_9^* \\ \alpha_4 s_7 - \alpha_3 s_8^* + \alpha_2 s_9^* + \alpha_1 s_{15}^* \end{bmatrix} + \text{noise} \quad (74)$$

$$_4R = \begin{bmatrix} \alpha_1 s_{10} + \alpha_2 s_{11} + \alpha_3 s_{12} - \alpha_4 s_{13} \\ \alpha_2 s_{10}^* - \alpha_1 s_{11}^* - \alpha_4 s_{12} + \alpha_3 s_{14}^* \\ \alpha_3 s_{10}^* + \alpha_4 s_{11} - \alpha_1 s_{12}^* - \alpha_2 s_{15}^* \\ \alpha_4 s_{10} - \alpha_3 s_{11}^* + \alpha_2 s_{12}^* \end{bmatrix} + \text{noise} \quad (75)$$

With the interference from the upper layer symbols $s_{13}^*$; $s_{14}^*$; $s_{15}$ (partly) cancelled, each of these subblocks can be decoded as a 4×4 block code of the form $C_{3/4}$, using metric (65) above.

Conversely, with the interference from the lowest layer cancelled, one can see from equations (72-75) that each received signal carries information of only one of the upper layer symbols, multiplied by a channel. It is clear how these can be maximal ratio combined by multiplying with suitable channel estimates. Due to the space-time block code structure of the upper layer, MRC gives four-diversity-branch combined estimates for the symbols.

For slow-fading channels, the linear I-step decoding described in the next Section, can be used as a starting point for iterative IC detection, making convergence faster. For fast fading channels, one should start the iterations by first detecting the lowest layer with no IC.

Linear I-Step Decoding $-\alpha_1 s_{13}$

An embodiment of the invention provides for a detection and interference cancellation procedure, which decodes in I-linear steps the preferred embodiment I-layered code built on space-time block code $C_{3/4}$. The channels are supposed to be almost static over the I-layer processing period of length $2^{2l}$.

In addition to the estimated channel, we shall also need the vector of squared channels $\alpha^2=(\alpha_1^2,\alpha_2^2,\alpha_3^2,\alpha_4^2)$, and for the I-layer code, the vector of fourth powers of channels, $\alpha^4=(\alpha_1^4,\alpha_2^4,\alpha_3^4,\alpha_4^4)$ up to the vector of 2l-2:th powers of channels $\alpha^{(2l-2)}=\alpha^{2l-2}=(\alpha_1^{2l-2},\alpha_2^{2l-2},\alpha_3^{2l-2},\alpha_4^{2l-2})$.

First, the two-layer code constructed in FIG. 4 is decoded.

From each set $_mR$ of four received symbols in above equations (72-75), we can construct a second layer pseudo-received symbol, $$R_m^{(2)} = -\alpha^T \beta_0 {}_mR. \quad (76)$$

Here we see how the data encoded onto the redundant direction of the code-matrix $C_{3/4}$ is extracted from the received signals.

The pseudo-received symbols constructed in (70) carry the data encoded onto the redundant directions of the four first layer blocks. The vector of these pseudo-received symbols is $$R^{(2)} = \begin{bmatrix} \alpha_1^2 s_{13} + \alpha_2^2 s_{14} + \alpha_3^2 s_{15} \\ \alpha_2^2 s_{13}^* - \alpha_1^2 s_{14}^* - \alpha_4^2 s_{15} \\ \alpha_3^2 s_{13}^* + \alpha_4^2 s_{14} - \alpha_1^2 s_{15}^* \\ \alpha_4^2 s_{13} - \alpha_3^2 s_{14}^* + \alpha_2^2 s_{15}^* \end{bmatrix} + \text{noise} \quad (77)$$

Now one can employ a variant of the metric given above in (65) to decode the symbols $S_{13}$, $s_{14}$ and $s_{15}$. The ensuing decoding metric is $$M_k^2 = |R^{(2)H}\beta_{k+}\alpha^{(2)} + \alpha^{(2)H}\beta_{k-}^H R^{(2)} - s_k|^2 + (\alpha^{(2)H}\alpha^{(2)} - 1)|s_k|^2 \quad (78)$$

which gives an estimate for $s_{12+k}$, when the detection matrices $\beta_{k\pm}$ are used.

These estimates should now be subtracted from the received symbols. To minimize interference, on may compute (e.g. the maximum a posteriori (MAP) estimates of the transmitted higher layer symbols, $\{\hat{s}_{13}, \hat{s}_{14}, \hat{s}_{15}\}$, and of the higher layer code matrix $$\hat{C}^2 = \begin{bmatrix} \hat{s}_{13} & \hat{s}_{14} & \hat{s}_{15} & 0 \\ -\hat{s}_{14}^* & \hat{s}_{13}^* & 0 & -\hat{s}_{15} \\ -\hat{s}_{15}^* & 0 & \hat{s}_{13}^* & \hat{s}_{14} \\ 0 & \hat{s}_{15}^* & -\hat{s}_{14}^* & \hat{s}_{13} \end{bmatrix}. \quad (79)$$

Denoting the matrices with rows of this matrix on the diagonal as $\hat{C}_m^{(2,diag)}$, m=1,2,3,4, we can cancel the interference from the blocks of four successive received symbols (71) above:

$$m\tilde{R} = mR - \beta_0 \hat{C}_m^{(2,diag)}\alpha. \quad (80)$$

These IC-cancelled blocks $\tilde{R}_m$ can now be decoded as conventional space-time blocks codes using metric (65).

The interference is only one-way; the upper layer bits disturb the lower layer bits, whereas the upper layer does not see the lower layer.

For a code with three or more layers, this procedure is iterated the corresponding number of times, always starting from the highest layer.

Thus, for the three layer code shown in FIG. 5, one first divides the 64 received symbols into 16 blocks of 4, $_mR$, m=1, . . . , 16. For each of these blocks, a second layer pseudo-received symbol $R_m^{(2)}$ is constructed as described above. These are collected into four blocks of four, $_nR^{(2)}$, N=1, . . . ,4. Each of these blocks are of form (77), plus third layer interference.

From each set $_nR^{(2)}$ of the four second-layer pseudo-received symbols, we can construct a third-layer pseudo-received symbol, $$R_n^{(3)} = -\alpha^{(2)T}\beta_0 \, _nR^{(2)}. \quad (81)$$

These carry the data encoded onto the redundant directions of the four second layer blocks, each consisting of four first layer blocks. To be explicit, the vector of these pseudo-received symbols is $$R^3 = \begin{bmatrix} \alpha_1^4 s_{61} + \alpha_2^4 s_{62} + \alpha_3^4 s_{63} \\ \alpha_2^4 s_{61}^* - \alpha_1^4 s_{62}^* - \alpha_4^4 s_{63} \\ \alpha_3^4 s_{61}^* + \alpha_4^4 s_{62} - \alpha_1^4 s_{63}^* \\ \alpha_4^4 s_{61} - \alpha_3^4 s_{62}^* + \alpha_2^4 s_{63}^* \end{bmatrix} + \text{noise} \quad (82)$$

This again may be decoded with the metric provided above. Thus, $$M_k^3 = |R^{(3)H}\beta_{k+}\alpha^{(4)} + \alpha^{(4)H}\beta_{k-}^H R^{(3)} - s_k|^2 + (\alpha^{(4)H}\alpha^{(4)} - 1)|s_k|^2 \quad (83)$$

which gives an estimate for $s_{60+k}$, when the detection matrices $\beta_{k\pm}$ are used.

These estimates should be subtracted from the second layer pseudo-received symbols collected into the blocks $_nR^{(2)}$. After third-layer interference cancellation, each of these blocks may be decoded with the metric (78), and again, after second-layer IC, the sixteen first-layer blocks may be decoded using metric (65).

The decoding of the l:th layer proceeds in a similar way, only that in constructing the l:th layer pseudo-received symbols, as in (76, 81), the channel vector $\alpha^{(2l-2)}$ is used, and in the l:th layer metric, corresponding to (78, 83), the channel vector $\alpha^{(2l-2)}$ is used.

By employing a different upper layer code, the rate of a layered code can be increased even more than by using the same code on all layers. The price to pay for this is performance losses due to non-coherent combining of upper layer channels.

Specifically, if one uses a full rate upper layer code, i.e. the Alamouti 2×2 block code, or just transmits one symbol on the upper layer, one gets completely power-balanced block codes with unit rate.

The simplest rate 1 code is the one where no code is used at the upper layer. That is, four complex symbols are encoded as $$C_{layered4\times4}(s_1, s_2, s_3, s_4) = \begin{bmatrix} s_1 & s_2 & s_3 & s_4 \\ -s_2^* & s_1^* & s_4 & -s_3 \\ -s_3^* & -s_4 & s_1^* & s_2 \\ -s_4 & s_3^* & -s_2^* & s_1 \end{bmatrix} \quad (84)$$

A two-step linear decoding of this code starts with creating a second layer pseudo-received symbol, as in Equation (76), then making a symbol decision for $s_4$ based upon this pseudo-received symbol, subtracting the interference from the lower layer, (i.e. $s_1$; $s_2$; $s_3$), and decoding them as a normal block code.

An optimal decoding procedure involves decoding the lower layer separately using metric (65) for each of the 4 possible upper layer ($s_4$) configurations and choosing the one which minimizes residual noise, or just searching the $4^4=256$ configurations of the full code for the optimal one.

The absolute square of the above matrix is $$C_{layered4\times4}^H C_{layered4\times4} = (s_1 s_1^* + s_2 s_2^* + s_3 s_3^* + s_4 s_4^*)I + N \quad (85)$$

where the non-orthogonality of the matrix N is $$N = 2\begin{bmatrix} 0 & \text{Re}[s_3 s_4] & -\text{Re}[s_2 s_4] & \text{Re}[s_1^* s_4] \\ -\text{Re}[s_3 s_4] & 0 & \text{Re}[s_1 s_4] & \text{Re}[s_2^* s_4] \\ \text{Re}[s_2 s_4] & -\text{Re}[s_1 s_4] & 0 & \text{Re}[s_3^* s_4] \\ \text{Re}[s_1^* s_4] & \text{Re}[s_2 s_4^*] & \text{Re}[s_3 s_4^*] & 0 \end{bmatrix}. \quad (86)$$

As a measure for non-orthogonality $\mu_{no}$, the magnitude of the off-diagonal elements are compared to the magnitude of the diagonal elements in the hermitean square (85) of the code matrix. More exactly, the expectation value of the ratio of the sum of the absolute squares of the off-diagonal elements to the sum of the absolute squares of the diagonal elements. This expectation value is taken over the set of codeword pair differences, i.e. over the set of all possible sets of four symbol difference, where the symbols are in the alphabet in question. In the preferred embodiment of the invention, this is QPSK.

$$\mu_{no} = \frac{1}{4} E\left(\left(\frac{\|N\|_2}{\sum_{i=1}^{4} |s_i|^2}\right)^2\right) \quad (87)$$

Thus, for the layered method and apparatus, the non-orthogonality measure is 3/8=0.375, (if QPSK modulation is used).

A unit-rate 2-layer code with better performance than the one above (but with double delay), can be built if the Alamouti code (3) is used on the upper layer. Thus, eight complex symbols would be encoded e.g. as a layered 8×4 block code with rate 1 given by $$C_{layered\ 8\times4}(s_1, s_2, s_3, s_4, s_5, s_6, s_7, s_8) = \begin{bmatrix} s_1 & s_2 & s_3 & s_4 \\ -s_2^* & s_1^* & s_8 & -s_3 \\ -s_3^* & -s_7 & s_1^* & s_2 \\ -s_7 & s_3^* & -s_2^* & s_1 \\ s_4 & s_5 & s_6 & s_7^* \\ -s_5 & s_4^* & s_7^* & -s_6 \\ -s_6^* & s_8^* & s_4^* & s_5 \\ s_8^* & s_6^* & -s_5^* & s_4 \end{bmatrix} \quad (88)$$

In a 2-step linear decoding procedure, the eight received signals are split into two groups of four, and from each group a pseudo-received symbol is constructed as in Equation (76). These are decoded as Alamouti block-coded symbols in the "squared" channel $\alpha^2 = (\alpha_1^2, \alpha_2^2, \alpha_3^2, \alpha_4^2)$ analogously to the decoding procedure for the rate-15/16 code. Interference is cancelled from the two lower layer codes, and these are decoded as a normal 4×4 block code, using the metric (65).

An optimal decoding involves searching through the 16 upper layer configurations, canceling the interference of these, decoding the lower layer using metric (65), and choosing the configuration which minimizes the residual noise.

The non-orthogonality determined by the procedure set out above measures 3/16 or 0.1875. The layered block code method is an iterative decoding that is based on interference cancellation between the fully orthogonal pieces of the layered code. It rapidly approaches the optimal performance provided by a maximum likelihood decoder. The co-pending application also provides a non-orthogonal four-antenna space-time block code based on a matrix of size 16×4, (i.e. it had a processing delay of 16 symbol periods or time epochs), with a rate equal to 15/16. The non-orthogonality of the code measures 2/25 or 0.08.

Figure 6B:
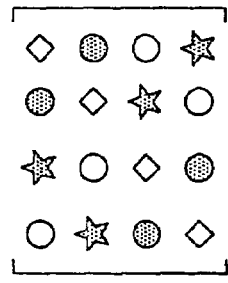
FIGS. 6A & 6B show the two forms of matrices from which a power-balanced full rate code may be constructed.
Figure 6A:
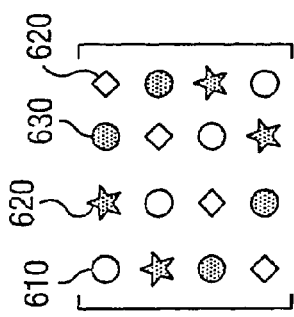

With constant-amplitude modulation, it is possible to design power-balanced codes so that the transmitted signal from each antenna has a constant power envelope. The matrix elements in the code matrices of such codes depend on only one modulation symbol. FIGS. 6A and 6B show the two forms of matrices from which a power-balanced full rate code may be constructed.

The symbol types, the first occurrence of which have reference numbers 610, 620, 630, 640, means that the corresponding matrix element depends on one symbol or its complex conjugate only. Moreover, for constant envelope symbols, all matrix elements have the same norm. This is natural from the full raw diversity point of view. Thus, any of the hollow circles 610 is some phase factor times $s_1$ or $s_1^*$; any of the stars 620 is some phase factor times $s_2$ or $s_2^*$; any of the solid circles 630 is some phase factor times $s_3$ or $s_3^*$; and any of the diamonds 640 is some phase factor times $s_4$ or $s_4^*$. It should be noted that in such an encoding, the germinal matrices, (i.e. the parts of the code matrix depending only on one of the symbols, are all unitary matrices by default.

It is easy to convince oneself that any power-balanced full rate, full raw diversity four-antenna code can be mapped to one of the two forms shown in FIGS. 6A and 6B by discrete matrix operations like interchanging columns and/or rows. These operations do not affect performance properties. Also, generic unitary transformations may be applied from left and/or right, changing the power spectrum, but leaving the performance unchanged.

Several versions of the 4×4 code with $\mu_{no}$=0.25 may be found. Two copies of the Alamounti block code or Radon-Hurwitz sub-matrix may be used to generate Space-Time Codes for more than 2 antennas, again this matrix form is given by:

$$Z_{12} = \begin{bmatrix} z_1 & z_2 \\ -z_2^* & z_1^* \end{bmatrix} \quad (89)$$

For minimal non-orthogonality, the four symbols may be arranged as follows replacing the complex (z) representation in the general sub-matrix form with (s) to represent the symbol to be transmitted.

$$C_{ABBA}(s_1, s_2, s_3, s_4) = \begin{bmatrix} s_1 & s_2 & s_3 & s_4 \\ -s_2^* & s_1^* & -s_4^* & s_3^* \\ s_3 & s_4 & s_1 & s_2 \\ -s_4^* & s_3^* & -s_2^* & s_1^* \end{bmatrix} \quad (89)$$

$C_{ABBA}$ has two of the 2×2 Alamouti block code with symbols $s_1$ and $s_2$ on the block diagonal, and has two copies of the Alamounti code with symbols $s_3$, $s_4$ on the block anti-diagonal in the form $$\begin{bmatrix} A & B \\ B & A \end{bmatrix}. \quad (91)$$

This embodiment may be referred to as the "ABBA" scheme. By taking $(s_3,s_4)=(s_1,s_2)$ during the first two time epochs $T_1$ and $T_2$, and $(s_1,s_2)=(s_3,s_4)$ during the last two $T_3$ and $T_4$, a transmission to a user with 3GPP release 99 equipment may be realized, provided that the common channel pilots are organized in a suitable way. Thus, providing for backward compatibility to 3GPP release 99 open-loop diversity.

The non-orthonormality of this embodiment is $$C_{ABBA}{}^H C_{ABBA} = (s_1 s_1^* + s_2 s_2^* + s_3 s_3^* + s_4 s_4^*)I + N \quad (92)$$

where the non-orthogonality matrix N is $$N = 2j\,\text{Im}[s_1 s_3^* + s_2 s_4^*]\begin{bmatrix} 0 & 0 & 1 & 0 \\ 0 & 0 & 0 & 1 \\ 1 & 0 & 0 & 0 \\ 0 & 1 & 0 & 0 \end{bmatrix} \quad (93)$$

This gives ¼ for the measure of non-orthogonality. The symbols $s_1$ and $s_2$ are orthogonally encoded with respect to each other, as are $s_3$ and $s_4$. All non-orthogonality is between these two sets. A three Tx-antenna version may be obtained by turning off one of the antennas.

For detection, the interference caused by symbols on each other, related to the non-orthonormality, has to be cancelled. The simple structure of the non-orthonormality matrix results in an easily implementable Least Minimal Mean Squares Estimate (LMMSE) decoding. Here, decoding in a one-path channel is considered. Multi-paths may be treated with known equalization methods.

As stated above, the channel is given by $h_k = \alpha_k e^{j\Theta_k}$ $\forall k=1$ to K. With K=4 for the four Tx antennas, the channel coefficients are $\alpha = [\alpha_1, \alpha_2, \alpha_3, \alpha_4]$, the received symbol vector is $$R = C_{ABBA}\alpha + \text{noise}. \quad (94)$$

For decoding, the following channel matrix may be used:

$$H = \begin{bmatrix} \alpha_1 & \alpha_2 & \alpha_3 & \alpha_4 \\ \alpha_2^* & -\alpha_1^* & \alpha_4^* & -\alpha_3^* \\ \alpha_3 & \alpha_4 & \alpha_1 & \alpha_2 \\ \alpha_4^* & -\alpha_3^* & \alpha_2^* & -\alpha_1^* \end{bmatrix} \quad (95)$$

With this, we may construct linear estimates of the symbols:

$$H \begin{bmatrix} R_1 \\ R_2^* \\ R_3 \\ R_4^* \end{bmatrix} = \left( (\alpha_1\alpha_1^* + \alpha_2\alpha_2^* + \alpha_3\alpha_3^* + \alpha_4\alpha_4^*)I + \tilde{N} \right) \begin{bmatrix} s_1 \\ s_2 \\ s_3 \\ s_4 \end{bmatrix} + \text{noise.} \quad (96)$$

One may use the Real or Imaginary parts of the code. Therefore, the correlation matrix was denoted $$N = 2j\,\text{Im}[s_1 s_3^* + s_2 s_4^*] \begin{bmatrix} 0 & 0 & 1 & 0 \\ 0 & 0 & 0 & 1 \\ 1 & 0 & 0 & 0 \\ 0 & 1 & 0 & 0 \end{bmatrix}, \text{ or} \quad (97)$$

$$N = 2\,\text{Re}[s_1 s_3^* + s_2 s_4^*] \begin{bmatrix} 0 & 0 & 1 & 0 \\ 0 & 0 & 0 & 1 \\ 1 & 0 & 0 & 0 \\ 0 & 1 & 0 & 0 \end{bmatrix}.$$

This matrix may be easily inverted. Leading to a Least Minimal Mean Squares Estimate (LMMSE) decoder. The decorrelating inverse of the correlation matrix may be taken with $$D = I - \frac{a}{1-a^2} \begin{bmatrix} 0 & 0 & 1 & 0 \\ 0 & 0 & 0 & 1 \\ 1 & 0 & 0 & 0 \\ 0 & 1 & 0 & 0 \end{bmatrix}, \quad (98)$$

where $$a = \frac{2j\,\text{Im}[\alpha_1\alpha_3^* + \alpha_2\alpha_4^*]}{\alpha_1\alpha_1^* + \alpha_2\alpha_2^* + \alpha_3\alpha_3^* + \alpha_4\alpha_4^* + b}, \text{ or} \quad (99)$$

$$a = \frac{2\,\text{Re}[\alpha_1\alpha_3^* + \alpha_2\alpha_4^*]}{\alpha_1\alpha_1^* + \alpha_2\alpha_2^* + \alpha_3\alpha_3^* + \alpha_4\alpha_4^* + b}.$$

With different values of b, different estimates for the symbols may be constructed. Decorrelation estimates may be found by putting b=0. Thus, $$D(b=0)H \begin{bmatrix} R_1 \\ R_2^* \\ R_3 \\ R_4^* \end{bmatrix} = \quad (100)$$

$$\left( (\alpha_1\alpha_1^* + \alpha_2\alpha_2^* + \alpha_3\alpha_3^* + \alpha_4\alpha_4^*)I + \tilde{N} \right) \begin{bmatrix} s_1 \\ s_2 \\ s_3 \\ s_4 \end{bmatrix} + \text{noise.}$$

With b, the sum of the Signal-to-Noise Ratios (SNR)s over the four channels, we get a LMMSE estimate.

As is the case in multi-user interference cancellation and as observed above regarding layered Space-Time Codes, iterative methods may be used to improve the estimates of correlating symbols. Thus, one may subtract from the received symbols the estimates of symbols $s_3$ and $s_4$, then detect the (orthogonally encoded) symbols $s_1$ and $s_2$, and vice versa. Moreover, in concordance with IC results for low interference, most of the benefit may be reaped with one re-iteration only.

Other embodiments of the ABBA code can now be constructed simply by replacing any number of the 2×2 blocks in the ABBA code by another equivalent 2×2 block, depending on the same two symbols.

Another way to build embodiments of the invention is to restrict the non-orthogonality to be block diagonal instead of the block off-diagonal non-orthogonality (97) of the preferred embodiment. Thus, one can take for example $$A(s1, s2) = \begin{bmatrix} s_1 & s_2 \\ \pm s_2 & \pm s_1 \end{bmatrix} \quad (101)$$

and build a code with the upper two blocks in ABBA being of the above form (101), and the lower two blocks being complex conjugates of the above form (101), e.g.

$$C_{ABBA(s_1,s_2,s_3,s_4)} = \begin{bmatrix} s_1 & s_2 & s_3 & s_4 \\ -s_2 & s_1 & s_4 & -s_3 \\ -s_3^* & -s_4^* & s_1^* & s_2^* \\ -s_4^* & s_3^* & -s_2^* & s_1^* \end{bmatrix} \quad (102)$$

The generalization of the ABBA code to five or to eight antennas is a twice iterated ABBA:

$$C = \begin{bmatrix} A & B & C & D \\ B & A & D & C \\ C & D & A & B \\ D & C & B & A \end{bmatrix} \quad (103)$$

where A; B; C; D are of the form (89), and depend on the symbols $(s_1;s_2)$, $(s_3;s_4)$, $(s_5;s_6)$, $(s_7;s_8)$ respectively. The non-orthogonality of this scheme measures to $\frac{3}{8}=0.375$. Also, the non-orthogonality matrix is scarce, so it can easily be inverted to produce a reliable LMMSE decoding scheme.

This code should be contrasted with the generalization of delay optimal layered codes to 8 dimensions which can be constructed from the orthogonal full diversity 8 antenna block code $$C_{layered4x4}(s_1, s_2, s_3, s_4) = \begin{bmatrix} s_1 & s_2 & s_3 & s_4 \\ -s_2^* & s_1^* & s_4 & -s_3 \\ -s_3^* & -s_4 & s_1^* & s_2 \\ -s_4 & s_3^* & -s_2^* & s_1 \end{bmatrix} \quad (104)$$

$$C_{1/2}(s_1, s_2, s_3, s_4) = \begin{bmatrix} s_1 & s_2 & s_3 & 0 & s_4 & 0 & 0 & 0 \\ -s_2^* & -s_1^* & 0 & -s_3 & 0 & -s_4 & 0 & 0 \\ -s_3^* & 0 & -s_1^* & s_2 & 0 & 0 & -s_4 & 0 \\ 0 & s_3^* & -s_2^* & s_1 & 0 & 0 & 0 & s_4 \\ -s_4^* & 0 & 0 & 0 & s_1^* & s_2 & s_3 & 0 \\ 0 & s_4^* & 0 & 0 & -s_2^* & s_1 & 0 & -s_3 \\ 0 & 0 & s_4^* & 0 & -s_3^* & 0 & s_1 & s_2 \\ 0 & 0 & 0 & -s_4^* & 0 & s_3^* & -s_2^* & s_1^* \end{bmatrix} \quad (105)$$

by overlaying it with a version of itself. The result is a power-balanced non-orthogonal code with rate 1

$$C(s_1, s_2, s_3, s_4, s_5, s_6, s_7, s_8) = \quad (106)$$

$$\begin{bmatrix} s_1 & s_2 & s_3 & s_5 & s_4 & s_6 & s_7 & s_8 \\ -s_2^* & -s_1^* & -s_5 & -s_3 & -s_6 & -s_4 & s_8^* & -s_7^* \\ -s_3^* & -s_5 & s_1^* & s_2 & s_7 & s_8^* & -s_4 & -s_6^* \\ s_5 & s_3^* & -s_2^* & s_1 & s_8 & -s_7^* & s_6^* & s_4 \\ -s_4^* & s_6 & s_7 & s_8^* & s_1^* & s_2 & s_3 & -s_5^* \\ -s_6 & s_4^* & s_8 & -s_7^* & -s_2^* & s_1 & s_5^* & -s_3 \\ s_7 & s_8 & s_4^* & -s_6^* & -s_3^* & s_5^* & s_1 & s_2 \\ s_8^* & -s_7^* & s_6^* & -s_4^* & -s_5^* & s_3^* & -s_2^* & s_1^* \end{bmatrix}$$

This code has non-orthogonality 1/2. Thus, the twice iterated ABBA code (103) may be superior to this scheme, and similarly superior to any scheme in which the code matrix is put together from two maximally orthogonal pieces.

Therefore, indicating that for any number of antennas, delay optimal minimally non-orthogonal space-time block codes may be constructed by repeatedly iterating the ABBA method.

An embodiment of the invention provides a class of sub-optimal space-time block codes. Referring back to the Radon-Hurwitz matrix $$Z_{12} = \begin{bmatrix} z_1 & z_2 \\ -z_2^* & z_1^* \end{bmatrix}.$$

It is a structured matrix because it may be filled with any complex pair of symbols. Also, this structured matrix may be used as a sub-block to construct structured matrix classes or families. Because there is direct relation between the Z matrix or structure and the $$H = \begin{bmatrix} h_1 & h_2 \\ h_2^* & -h_1^* \end{bmatrix}$$

matrix, the attention will be focused on the latter one. Subsequently, a few proprieties of H matrix are given below. The following matrix multiplication plays an important role in the class of space-time codes provide by the present invention:

$$H_{12}^H H_{34} = \begin{bmatrix} x & y \\ -y^* & x^* \end{bmatrix}, \text{ where } x = h_1^* h_3 + h_2 h_4^*, \quad (107)$$

and $y = h_1^* h_4 - h_2 h_3^*$.

Note that $H_{12}^H H_{34} + H_{34}^H H_{12} = \begin{bmatrix} x+x^* & 0 \\ 0 & x+x^* \end{bmatrix} \quad (108)$ and $$H_{12}^H H_{34} - (H_{34}^H H_{12})^* = \begin{bmatrix} 0 & y+y^* \\ -(y+y^*) & 0 \end{bmatrix}. \quad (109)$$

Denoting by L the number of transmitting antennas and by "⊗" the tensor product, the equivalent general form H matrix of the proposed space-time block code (STC) is given by $$H = \sum_{k=1}^{L/2} (C_{2k-1,2k} \otimes H_{2k-1,2k} + D_{2k-1,2k} \otimes H_{2k-1,2k}^*).$$

$C_{2k-1,2k}$ and $D_{2k-1,2k}$ are p×p matrices that:
have at most one nonzero entry for each row and column;
any two matrices cannot have a nonzero entry in the same position, (i.e. the matrices have disjoint nonzero entries);
a nonzero entry is modulus one (unit power);
a row in the H matrix is filled either by $H_{2k-1,2k}$ or by $H^*_{2k-1,2k}$ matrices.

This ensures that a given symbol is assigned only once to a given antenna and at a given time instant is sent by one antenna. Also, there is a one-to-one correspondence between H and S matrices.

For the purpose of presentation we denote by $H_k$, $C_k$ and $D_k$ the matrices:
$H_{2k-1,2k}$,
$C_{2k-1,2k}$, and
$D_{2k-1,2k}$, respectively.
Using (13), the general form of (5) is:

$$r = Hs + n \quad (111)$$

In the detection process, matched filtering is performed, (i.e. left-side multiplication of (14) by the $H^H$ matrix). Using the fact that:

$$C_k^H D_j = D_k^H C_j = 0 \quad (112)$$

this multiplication yields:

$$H^{(1)} = H^H H = \sum_{i=1}^{L/2} (C_i^H C_i) \otimes (H_i^H H_i) + \quad (113)$$

$$\sum_{\substack{i,j=1 \\ i \neq j}}^{L/2} (C_i^H C_j) \otimes (H_i^H H_j) + \sum_{i=1}^{L/2} (D_i^H D_i) \otimes (H_i^H H_i) +$$

$$\sum_{\substack{i,j=1 \\ i \neq j}}^{L/2} (D_i^H D_j) \otimes (H_i^H H_j)^*$$

$$= \sum_{i=1}^{L/2} I_p \otimes (H_i^H H_i) + \sum_{\substack{i,j=1 \\ i \neq j}}^{L/2} (C_i^H C_j) \otimes (H_i^H H_j) +$$

$$\sum_{\substack{i,j=1 \\ i \neq j}}^{L/2} (D_i^H D_j) \otimes (H_i^H H_j)^*$$

Usually, $H^{(1)}$ has nonzero entries in all positions. Therefore a multi-user detector, which may include de-correlating and decision-feedback, should be employed for data estimation. However, if relations (102) or (103) (above) could be exploited, the number of nonzero entries in $H^{(1)}$ can be halved. This will significantly reduce the cross-interference terms, thus improving the detector performance.

In this case we assume $D_k=0$ for any k, or $C_k=0$ for any k. To halve the nonzero entries in $H^{(1)}$, the following must hold for any (i,j) pair, wherein relation (108) is applicable:

$$C_i^H C_j = C_j^H C_i, \quad (\forall i \neq j) \quad (114)$$

or $$D_i^H D_j = D_j^H D_i, \quad (\forall i \neq j). \quad (115)$$

In an alternative embodiment, we assume that both $D_k$ and $C_k$ are nonzero matrices. Relation (109) is applicable if:

$$C_i^H C_j = -(D_j^H D_i), \quad (\forall i \neq j). \quad (116)$$

The number of nonzero entries in $H^{(1)}$ can be halved if relation (116) holds for any (i,j) pair.

In addition to the examples for recovering the transmitted symbols another example may be found in found in co-pending U.S. patent application Ser. No. 09/539,819 filed on Mar. 31, 2000 entitled SPACE-TIME CODE FOR MULTIPLE ANTENNA TRANSMISSION, assigned to assignee of the present invention and incorporated herein by reference. The application provides a system to recover transmitted symbols using a maximum likelihood sequence estimator (MLSE) decoder implemented with the Viterbi algorithm with a decoding trellis.

Let us consider the four-antenna case. It is easy to see that, for example, the following pair of matrices verify relation (114):

$$C_{12} = \begin{bmatrix} 1 & 0 \\ 0 & 1 \end{bmatrix} \text{ and } C_{34} = \begin{bmatrix} 0 & 1 \\ 1 & 0 \end{bmatrix}, \text{ or} \quad (117)$$

$$C_{12} = \begin{bmatrix} 1 & 0 \\ 0 & j \end{bmatrix} \text{ and } C_{34} = \begin{bmatrix} 0 & 1 \\ j & 0 \end{bmatrix}. \quad (118)$$

Using relation (117) results in:

$$H = \begin{bmatrix} H_{12} & H_{34} \\ H_{34} & H_{12} \end{bmatrix}; H^{(1)} = \begin{bmatrix} a & 0 & b & 0 \\ 0 & a & 0 & b \\ b & 0 & a & 0 \\ 0 & b & 0 & a \end{bmatrix}, \quad (119)$$

$$a = \|h_1\|^2 + \|h_2\|^2 + \|h_3\|^2 + \|h_4\|^2$$

$$b = x + x^*, x \text{ given in (107)}$$

$$y^{(1)} = H^H r = H^{(1)} s + H^H n$$

Note that $H^{(1)}$ is circular matrix and denoting:

$$H^{(2)} = \begin{bmatrix} a & 0 & -b & 0 \\ 0 & a & 0 & -b \\ -b & 0 & a & 0 \\ 0 & -b & 0 & a \end{bmatrix} \quad (120)$$

results in:

$$H^{(2)} H^H r = H^{(2)} H^H (Hs + n) \quad (121)$$

$$= H^{(2)} H^{(1)} s + H^{(2)} H^H n$$

$$= (a^2 - b^2) I_4 s + H^{(2)} H^H n$$

Applying sign(·) function in relation (121) gives the data estimates of s. Thus, the detection is very simple but the noise is enhanced [see (121)]. However, these data estimates can be further improved using a multistage interference cancellation (MIC) scheme. Relation (121) provides the first data estimates (first stage). The next stage(s) can use $y^{(1)}$ from relation (119) and the previous stage data estimations to cancel the interference given by the b elements in $H^{(1)}$ the matrix. The computation overhead introduced by MIC is insignificant because $H^{(1)}$ is a sparse matrix. A sparse matrix is a matrix where the number of nonzero elements situated off the main diagonal is less than the number of zero elements. Also, b is a real value thus, multiplication with $\pm 1 \pm j$ is as a matter of fact a change of sign. The estimation can be performed using hard bit or soft bit decision. The algorithm can provide soft outputs, which is desirable for the next processing blocks, (e.g. convolutional decoder).

An example of a scheme that includes the $D_{2k-1,2k}$ matrices [see (110)] is:

$$H = \begin{bmatrix} H_{12} & H_{34} \\ -H_{34}^* & H_{12}^* \end{bmatrix} \quad (122)$$

For this scheme, (109) is applicable while the detection complexity is kept at the same level as in the previous case.

Some remarks regarding the proposed class of STC are underlined subsequently.

There is an intrinsic relation between the Z matrix that provides the STC and its equivalent representation in the H matrix. The design has been carried out using the H matrix because the target was a simple receiver.

The STC design presented herein is quite general and straightforward. Also, can provide a rate R=1 STC.

Different STC schemes of the proposed class can be concatenated, i.e. a sequence generated by relations (119) and (122), alternately.

Embodiments of the invention has been shown as exemplars. Alternative and modifications by those skilled in the art are deemed to be in the spirit and scope of the invention. For example, consider the following.

It is well known that there exist several equivalent versions of the Alamouti code. For example, the code $$C_{ALA2} = \begin{bmatrix} s_1 & s_2 \\ s_2^* & -s_1^* \end{bmatrix} \quad (123)$$

has exactly the same decoding properties as (108) and (109). Thus, other embodiments of code structures may use these Alamouti versions, (e.g. (123), as sub-blocks to construct structured matrix classes).

Another way to build embodiments of the invention is to operate permutations, which may be column-wise or row-wise, on a given STC structure, as in the following example, wherein the step of permuting is denoted by the arrow $$S = \begin{bmatrix} s_1 & s_2 & s_3 & s_4 \\ -s_2^* & s_1^* & -s_4^* & -s_3^* \\ s_3 & s_4 & s_1 & s_2 \\ -s_4^* & -s_3^* & -s_2^* & -s_1^* \end{bmatrix} \rightarrow S = \begin{bmatrix} s_1 & s_2 & s_3 & s_4 \\ s_3 & s_4 & s_1 & s_2 \\ -s_2^* & s_1^* & -s_4^* & -s_3^* \\ -s_4^* & -s_3^* & -s_2^* & -s_1^* \end{bmatrix} \quad (124)$$

where the second and the third row have been permuted. Note that the first S matrix in (124) is the counterpart of the H matrix in (119).

Also, deterministic phase rotations can be applied to antennas. Recall that the columns are associated with the antennas. Therefore if a phase rotation is applied to all the elements of a given column, this will translate as a phase rotation to the corresponding channel, and implicitly to the corresponding antenna. This can be useful to combat the degradation due to the fading.

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. A method of transmitting a digital signal consisting of symbols, the method comprising the steps of:
   coding complex symbols to channel symbols in blocks of given length; and
   transmitting the channel symbols via several different channels and two or more antennas, and wherein the coding is defined by a code matrix comprising an orthogonal block code, in that information is transmitted in redundant directions of the orthogonal code with an increased orthogonal code rate.

2. The method of claim 1, wherein the information to be transmitted in the redundant directions is coded by a block code.

3. The method of claim 2, wherein the information to be transmitted in the redundant directions and the information to be transmitted in other directions are coded by a similar block code.

4. The method of claim 2, wherein the information to be transmitted in the redundant directions and the information to be transmitted in other directions are coded by a different block code.

5. The method of claim 1, wherein the information to be transmitted in the redundant directions is information that is not channel-coded.

6. The method of claim 2, wherein the block coding of the information to be transmitted in the redundant directions is performed in several successive blocks of the block code of the information to be transmitted in other directions.

7. The method of claim 1, wherein the information to be transmitted in the redundant directions is transmitted in zero points of the code matrix of the information to be transmitted in other directions.

8. The method of claim 2, wherein other coded information is transmitted in the redundant directions that have remained after the addition of an upper level block code.

9. The method of claim 7, wherein other coded information is transmitted in the redundant directions that have remained after the addition of an upper level block code.

10. The method of claim 2, wherein known pilot symbols are transmitted in the redundant directions that have remained after the addition of the information to be transmitted in the redundant directions.

11. The method of claim 7, wherein known pilot symbols are transmitted in the redundant directions that have remained after the addition of the information to be transmitted in the redundant directions.

12. The method of claim 8, wherein known pilot symbols are transmitted in the redundant directions that have remained after the addition of the information to be transmitted in the redundant directions.

13. The method of claim 9, wherein known pilot symbols arc transmitted in the redundant directions that have remained after the addition of the information to be transmitted in the redundant directions.

14. An arrangement for transmitting a digital signal consisting of symbols, said arrangement comprising:
   means at the transmission end for coding complex symbols to channel symbols in blocks of given length, wherein the coding is defined by a code matrix comprising an orthogonal block code;
   means for transmitting the channel symbols via several different channels and two or more antennas; and
   means for including information in redundant directions of the orthogonal code with an increased orthogonal code rate.

15. The arrangement of claim 14, further comprising means for coding the information to be transmitted in the redundant directions by a block code.

16. The arrangement of claim 15, further comprising means for coding the information to be transmitted in the redundant directions and the information to be transmitted in other directions by a similar block code.

17. The arrangement of claim 15, further comprising means for coding the information to be transmitted in the redundant directions and the information to be transmitted in other directions by a different block code.

18. The arrangement of claim 15, further comprising means for including known pilot symbols in the redundant directions that have remained after the addition of the block code of the information to be transmitted in the redundant directions.

19. The method of claim 2, wherein the information to be transmitted in the redundant directions is transmitted in zero points of the code matrix of the information to be transmitted in other directions.

20. The method of claim 3, wherein other coded information is transmitted in the redundant directions that have remained after the addition of an upper level block code.

21. The method of claim 19, wherein other coded information is transmitted in the redundant directions that have remained after the addition of an upper level block code.

22. The method of claim 3, wherein known pilot symbols are transmitted in the redundant directions that have remained after the addition of the information to be transmitted in the redundant directions.

23. The method of claim 19, wherein known pilot symbols are transmitted in the redundant directions that have remained after the addition of the information to be transmitted in the redundant directions.

24. The method of claim 20, wherein known pilot symbols are transmitted in the redundant directions that have remained after the addition of the information to be transmitted in the redundant directions.

25. The method of claim 21, wherein known pilot symbols are transmitted in the redundant directions that have remained after the addition of the information to be transmitted in the redundant directions.

26. The method of claim 4, wherein other coded information is transmitted in the redundant directions that have remained after the addition of an upper level block code.

27. The method of claim 4, wherein known pilot symbols are transmitted in the redundant directions that have remained after the addition of the information to be transmitted in the redundant directions.

28. The method of claim 26, wherein known pilot symbols are transmitted in the redundant directions that have remained after the addition of the information to be transmitted in the redundant directions.

29. The method of claim 5, wherein other coded information is transmitted in the redundant directions that have remained after the addition of an upper level block code.

30. The method of claim 5, wherein known pilot symbols are transmitted in the redundant directions that have remained after the addition of the information to be transmitted in the redundant directions.

31. The method of claim 29, wherein known pilot symbols are transmitted in the redundant directions that have remained after the addition of the information to be transmitted in the redundant directions.

32. The method of claim 6, wherein other coded information is transmitted in the redundant directions that have remained after the addition of an upper level block code.

33. The method of claim 6, wherein known pilot symbols are transmitted in the redundant directions that have remained after the addition of the information to be transmitted in the redundant directions.

34. The method of claim 32, wherein known pilot symbols are transmitted in the redundant directions that have remained after the addition of the information to be transmitted in the redundant directions.

* * * * *

UNITED STATES PATENT AND TRADEMARK OFFICE
CERTIFICATE OF CORRECTION

PATENT NO. : 7,355,961 B2  
APPLICATION NO. : 11/070624  
DATED : April 8, 2008  
INVENTOR(S) : Tirkkonen Page 1 of 2

It is certified that error appears in the above-identified patent and that said Letters Patent is hereby corrected as shown below:

On the Title Page, Section (56) References Cited, FOREIGN PATENT DOCUMENTS, Page 2, 8th entry, delete "00/61265" and insert --00/51265--.

On the Title Page, Section (56) References Cited, FOREIGN PATENT DOCUMENTS, Page 2, 10th entry, delete "6/2001" and insert --8/2001--.

On the Title Page, Section (56) References Cited, OTHER PUBLICATIONS, Page 2, 2nd Column, 1st entry, delete "Beffins" and insert --Baffins--.

On the Title Page, Section (56) References Cited, OTHER PUBLICATIONS, Page 2, 2nd Column, 1st entry, delete "1UD" and insert --IUD--.

On the Title Page, Section (56) References Cited, OTHER PUBLICATIONS, Page 2, 2nd Column, 13th entry, delete "5108" and insert --5106--.

In Col. 1, line 44, delete "<a|" and insert --$\langle a|$--.

In Col. 1, line 46, delete "|b>" and insert --$|b\rangle$--.

In Col. 2, line 3, delete "<a|b>=<b|a>*" and insert --$\langle a|b\rangle = \langle b|a\rangle$ *--.

In Col. 2, line 5, delete "<a|(β|b)+γ|c>)=β<a|b>+γ<a|c>" and insert --$\langle a|(\beta\,|b\rangle+\gamma|c\rangle\,)=\beta\,\langle a|b\rangle +\gamma\,\langle a|c\rangle$--.

In Col. 2, line 7, delete "<a/a>≥0, and <a|a>=0 iff|a>=0." and insert --$\langle a|\,a\rangle \geq 0$, and $\langle a|\,a\rangle =0$ iff$|a\rangle =0$--.

In Col. 2, line 52, delete "$\{|e_i>\}_{i=1}^N$" and insert -- $\{|e_i\rangle\}_{i=1}^N$ --.

In Col. 2, line 54, delete "|a>, |b>∈V" and insert --$|a\rangle , |b\rangle \in V$--.

In Col. 2, line 54, delete "<a|b>=0." and insert --$\langle a|b\rangle =0$--.

In Col. 2, line 66, delete "|b>=A|a>" and insert --$|b\rangle =A|a\rangle$--.

In Col. 2, line 67, delete "|a>" and insert --$|a\rangle$--.

In Col. 2, line 67, delete "|b>," and insert --$|b\rangle$ ,--.

In Col. 3, line 7, delete "<b|A|a>*=<a|$A^H$|b>" and insert --$\langle b|A|a\rangle$ *= $\langle a|A^H|b\rangle$--.

In Col. 14, line 26, delete "$z_k=x_k+iy_k$" and insert --$z_k=x_k+jy_k$--.

In Col. 15, line 12, delete "$\delta_k$," and insert --$\beta_k$,--.

In Col. 16, line 39, delete "$\tilde{\gamma}=-j\,\gamma_1\gamma_2\gamma_3$" and insert --$\tilde{\gamma}_3=-j\,\gamma_1\gamma_2\gamma_3$--.

In Col. 16, line 49, delete "$\gamma_1=I_2\sigma_1; \gamma_2=I_2\sigma_2\tilde{\gamma}_3= \sigma_1 I_2; \tilde{\gamma}_4=\sigma_2 I_2$." and insert --$\gamma_1=I_2 \otimes \sigma_1; \gamma_2=I_2 \otimes \sigma_2\, \tilde{\gamma}_3= \sigma_1 \otimes I_2; \tilde{\gamma}_4=\sigma_2 \otimes I_2$.--.

In Col. 17, line 55, delete "$R_K(\gamma_j)=I_2R_{K-2}(\gamma_j)$, j=1," and insert --$R_K(\gamma_j)=I_2\otimes R_{K-2}(\gamma_j)$, j=1,--.

In Col. 17, line 57, delete "$R_K(\tilde{\gamma}_{K-1})=R_2(\gamma_1)I_{dim}R_{K-2}$" and insert --$R_K(\tilde{\gamma}_{K-1})=R_2(\gamma_1) \otimes I_{dim}R_{K-2}$--.

In Col. 17, line 59, delete "$R_K(\tilde{\gamma}_K)=R_2(\gamma_2)I_{dim}R_{K-2}$" and insert --$R_K(\tilde{\gamma}_K)=R_2(\gamma_2) \otimes I_{dim}R_{K-2}$--.

UNITED STATES PATENT AND TRADEMARK OFFICE
CERTIFICATE OF CORRECTION

PATENT NO. : 7,355,961 B2
APPLICATION NO. : 11/070624
DATED : April 8, 2008
INVENTOR(S) : Tirkkonen It is certified that error appears in the above-identified patent and that said Letters Patent is hereby corrected as shown below:

In Col. 20, line 38, delete "lth" and insert --$l$th--.
In Col. 20, line 38, delete "$K$-l-1" and insert --$K$-$l$-1--.
In Col. 20, line 40, delete "1-1" and insert --$l$-1--.
In Col. 20, line 41, delete "lth" and insert --$l$th--.
In Col. 20, line 52, delete "lth" and insert --$l$th--.
In Col. 25, line 18, delete "nth" and insert --$n$th--.
In Col. 25, line 19, delete "mth" and insert --$m$th--.
In Col. 25, line 30, delete "m" and insert --$m$--.
In Col. 25, line 31, delete "t" and insert --$t$--.
In Col. 25, line 42, delete "kth" and insert --$k$th--.
In Col. 30, line 32, delete "R=C($\bar{s}$)α+noise" and insert --$R$-$C$($\bar{s}$)α+noise--.
In Col. 40, line 39, delete """" and insert --"$\otimes$"--.

Signed and Sealed this

Twenty-ninth Day of September, 2009

David J. Kappos
*Director of the United States Patent and Trademark Office*

UNITED STATES PATENT AND TRADEMARK OFFICE
CERTIFICATE OF CORRECTION

PATENT NO.         : 7,355,961 B2
APPLICATION NO.    : 11/070624
DATED              : April 8, 2008
INVENTOR(S)        : Tirkkonen Page 1 of 1

It is certified that error appears in the above-identified patent and that said Letters Patent is hereby corrected as shown below:

At Col. 8, line 54, after "may not" please insert --be--.

At Col. 12, line 11, please delete "UMTS" and insert --Universal Mobile Telecommunications System (UMTS)--.

At Col. 12, line 11, please delete "UTRAN" and insert --UMTS Terrestrial Radio Access Network (UTRAN)--.

At Col. 12, line 13, please delete "lu" and insert --Iu--.

At Col. 12, line 14, please delete "UE" and insert --user equipment (UE)--.

At Col. 12, line 15, please delete "RNS" and insert --(RNS)--.

At Col. 12, line 16, please delete "lur" and insert --Iur--.

At Col. 12, line 17, please delete "RNC" and insert --(RNC)--.

At Col. 12, line 18, please delete "lub" and insert --Iub--.

At Col. 12, line 45, please delete "lub" and insert --Iub--.

At Col. 13, line 34, please delete "have" and insert --has--.

At Col. 30, line 14, please delete "of" and insert --off--.

Signed and Sealed this

Thirtieth Day of March, 2010

David J. Kappos
*Director of the United States Patent and Trademark Office*